US012624161B2

(12) United States Patent
Priedeman, Jr.

(10) Patent No.: US 12,624,161 B2
(45) Date of Patent: May 12, 2026

(54) WATER DISPERSIBLE POLYMER FOR USE IN ADDITIVE MANUFACTURING

(71) Applicant: Stratasys, Inc., Minnetonka, MN (US)

(72) Inventor: William R. Priedeman, Jr., Long Lake, MN (US)

(73) Assignee: Stratasys, Inc., Minnetonka, MN (US)

( * ) Notice: Subject to any disclaimer, the term of this patent is extended or adjusted under 35 U.S.C. 154(b) by 830 days.

(21) Appl. No.: 17/530,145

(22) Filed: Nov. 18, 2021

(65) Prior Publication Data

US 2022/0073677 A1 Mar. 10, 2022

Related U.S. Application Data

(62) Division of application No. 15/737,579, filed as application No. PCT/US2016/038140 on Jun. 17, 2016, now Pat. No. 11,186,679.

(Continued)

(51) Int. Cl.

*C08G 63/688* (2006.01)
*B29C 64/106* (2017.01)

(Continued)

(52) U.S. Cl.

CPC ........ *C08G 63/6886* (2013.01); *B29C 64/106* (2017.08); *B29C 64/118* (2017.08); *B29C 64/40* (2017.08); *B33Y 30/00* (2014.12); *B33Y 70/00* (2014.12); *C08G 18/0828* (2013.01); *C08G 18/3855* (2013.01); *C08G 69/42* (2013.01); *C08J 5/00* (2013.01); *C08J 11/06* (2013.01); *G03G 9/08755* (2013.01); *G03G 9/08766* (2013.01); *G03G 15/1625* (2013.01); *G03G 15/224* (2013.01); *B29K 2081/00* (2013.01); *B29K 2995/0062* (2013.01);

(Continued)

(58) Field of Classification Search

None

See application file for complete search history.

(56) References Cited

U.S. PATENT DOCUMENTS

| | | | |
|---|---|---|---|
| 2,696,482 | A | 12/1954 | Pease |
| 3,000,854 | A | 9/1961 | Favre |

(Continued)

FOREIGN PATENT DOCUMENTS

| | | | |
|---|---|---|---|
| CA | 3052023 | A1 | 8/2018 |
| CN | 107206673 | A | 2/2015 |

(Continued)

OTHER PUBLICATIONS

Final Rejection from corresponding U.S. Appl. No. 16/591,198, mailed Oct. 26, 2022.

(Continued)

*Primary Examiner* — Ha S Nguyen

(74) *Attorney, Agent, or Firm* — Westman, Champlin & Koehler, P.A.

(57) ABSTRACT

A water dispersible sulfopolymer for use as a material in the layer-wise additive manufacture of a 3D part made of a non water dispersible polymer wherein the water dispersible polymer is a reaction product of a metal sulfo monomer, the water dispersible sulfo-polymer being dispersible in water resulting in separation of the water dispersible polymer from the 3D part made of the non water dispersible polymer.

22 Claims, 7 Drawing Sheets

Related U.S. Application Data

(60) Provisional application No. 62/182,159, filed on Jun. 19, 2015.

(51) Int. Cl.

| | |
|---|---|
| ***B29C 64/118*** | (2017.01) |
| ***B29C 64/40*** | (2017.01) |
| ***B29K 81/00*** | (2006.01) |
| ***B33Y 30/00*** | (2015.01) |
| ***B33Y 70/00*** | (2020.01) |
| ***C08G 18/08*** | (2006.01) |
| ***C08G 18/38*** | (2006.01) |
| ***C08G 69/36*** | (2006.01) |
| ***C08G 69/42*** | (2006.01) |
| ***C08J 5/00*** | (2006.01) |
| ***C08J 11/06*** | (2006.01) |
| ***C08L 101/02*** | (2006.01) |
| ***C08L 101/14*** | (2006.01) |
| ***G03G 9/087*** | (2006.01) |
| ***G03G 15/16*** | (2006.01) |
| ***G03G 15/22*** | (2006.01) |

(52) U.S. Cl.
CPC ........ *C08J 2300/22* (2013.01); *C08J 2355/02* (2013.01); *C08J 2367/02* (2013.01); *C08J 2367/04* (2013.01); *C08J 2369/00* (2013.01); *C08J 2377/06* (2013.01); *C08J 2467/02* (2013.01); *C08J 2477/06* (2013.01); *G03G 2215/1695* (2013.01)

(56) References Cited

U.S. PATENT DOCUMENTS

| | | | | |
|---|---|---|---|---|
| 3,296,204 | A | | 1/1967 | Caldwell |
| 3,446,651 | A | | 5/1969 | Clachan |
| 3,779,993 | A | | 12/1973 | Kibler et al. |
| 4,304,901 | A | | 12/1981 | O'Neill et al. |
| 4,604,431 | A | | 8/1986 | Fong et al. |
| 4,746,717 | A | | 5/1988 | Larson |
| 4,797,450 | A | | 1/1989 | Dehm et al. |
| 4,801,388 | A | | 1/1989 | Fong et al. |
| 4,855,384 | A | | 8/1989 | Larson |
| 4,863,538 | A | | 9/1989 | Deckard |
| 4,904,531 | A | | 2/1990 | Kelly |
| 4,919,821 | A | | 4/1990 | Fong et al. |
| 4,931,510 | A | | 6/1990 | Sackman et al. |
| 4,940,744 | A | | 7/1990 | Tortorici |
| 5,132,143 | A | | 7/1992 | Deckard |
| 5,204,055 | A | | 4/1993 | Sachs et al. |
| 5,369,210 | A | | 11/1994 | George |
| 5,503,785 | A | | 4/1996 | Crump et al. |
| 5,679,754 | A | | 10/1997 | Larson et al. |
| 5,846,524 | A | * | 12/1998 | Breitenbach ............. A61K 8/88 424/70.17 |
| 6,004,124 | A | | 12/1999 | Swanson et al. |
| 6,036,962 | A | * | 3/2000 | Muller ..................... A61Q 3/02 424/70.17 |
| 6,067,480 | A | | 5/2000 | Stuffle et al. |
| 6,070,107 | A | | 5/2000 | Lombardi et al. |
| 6,140,003 | A | * | 10/2000 | Sacripante ......... G03G 9/09733 430/108.4 |
| 6,228,923 | B1 | | 5/2001 | Lombardi et al. |
| 6,310,132 | B1 | | 10/2001 | Sackmann et al. |
| 6,437,034 | B2 | | 8/2002 | Lombardi et al. |
| 6,488,994 | B1 | | 12/2002 | Haller et al. |
| 6,547,995 | B1 | | 4/2003 | Comb |
| 6,645,412 | B2 | | 11/2003 | Priedeman, Jr. |
| 6,680,364 | B1 | | 1/2004 | Linemann |
| 7,122,246 | B2 | | 10/2006 | Comb et al. |
| 7,384,255 | B2 | | 6/2008 | LaBossiere et al. |
| 7,604,470 | B2 | | 10/2009 | LaBossiere et al. |
| 7,625,200 | B2 | | 12/2009 | Leavitt |
| 7,896,209 | B2 | | 3/2011 | Batchelder et al. |
| 8,153,182 | B2 | | 4/2012 | Comb et al. |
| 8,221,858 | B2 | | 7/2012 | Mannella et al. |
| 8,419,996 | B2 | | 4/2013 | Swanson et al. |
| 8,488,994 | B2 | | 7/2013 | Hanson et al. |
| 8,647,102 | B2 | | 2/2014 | Swanson et al. |
| 8,652,636 | B2 | | 2/2014 | Beck |
| 8,879,957 | B2 | | 11/2014 | Hanson et al. |
| 8,926,882 | B2 | | 1/2015 | Batchelder et al. |
| 9,399,691 | B2 | | 7/2016 | Ruggieri et al. |
| 9,423,756 | B2 | | 8/2016 | Hanson et al. |
| 9,523,934 | B2 | | 12/2016 | Orrock et al. |
| 9,557,661 | B2 | | 1/2017 | Martin |
| 9,777,090 | B2 | | 10/2017 | Ruggieri et al. |
| 10,100,168 | B2 | | 10/2018 | Bayer et al. |
| 10,308,743 | B2 | | 6/2019 | Ruggieri |
| 2004/0260034 | A1 | | 12/2004 | Haile |
| 2005/0004282 | A1 | | 1/2005 | Priedeman, Jr. et al. |
| 2007/0041796 | A1 | | 2/2007 | Irie |
| 2008/0207833 | A1 | | 8/2008 | Bear et al. |
| 2011/0095444 | A1 | | 4/2011 | Haile et al. |
| 2011/0263753 | A1 | | 10/2011 | Harkal et al. |
| 2012/0264858 | A1 | | 10/2012 | Hintze-Bruning |
| 2013/0077996 | A1 | | 3/2013 | Hanson et al. |
| 2013/0077997 | A1 | | 3/2013 | Hanson et al. |
| 2013/0186549 | A1 | | 7/2013 | Comb et al. |
| 2013/0186558 | A1 | | 7/2013 | Comb et al. |
| 2013/0192779 | A1 | | 8/2013 | Parker et al. |
| 2015/0024316 | A1 | | 1/2015 | Orrock et al. |
| 2015/0227062 | A1 | | 8/2015 | Martin |
| 2017/0022341 | A1 | | 1/2017 | Bayer et al. |
| 2017/0232684 | A1 | | 8/2017 | Yoshimura et al. |
| 2017/0240675 | A1 | | 8/2017 | Yoshimura et al. |
| 2017/0369622 | A1 | | 12/2017 | Inouble et al. |
| 2018/0009160 | A1 | * | 1/2018 | Sawada ................. B29C 64/106 |
| 2018/0030234 | A1 | | 2/2018 | Priedeman, Jr. |
| 2018/0043627 | A1 | | 2/2018 | Barclay et al. |
| 2018/0050495 | A1 | | 2/2018 | Stolyarov et al. |
| 2018/0142077 | A1 | | 5/2018 | Kimura et al. |
| 2018/0179332 | A1 | | 6/2018 | Priedeman, Jr. |
| 2018/0305518 | A1 | | 10/2018 | Simonyan |
| 2019/0071545 | A1 | | 3/2019 | Albrecht |
| 2020/0031993 | A1 | | 1/2020 | Priedeman, Jr. |
| 2020/0127276 | A1 | | 4/2020 | Kim et al. |
| 2020/0157276 | A1 | | 5/2020 | Yoshimura et al. |
| 2020/0207025 | A1 | | 7/2020 | Priedeman |
| 2020/0254695 | A1 | | 8/2020 | Mastroianni et al. |
| 2021/0087341 | A1 | | 3/2021 | Sawada et al. |

FOREIGN PATENT DOCUMENTS

| | | | | | |
|---|---|---|---|---|---|
| CN | 104520484 | A | | 4/2015 | |
| EP | 3689585 | A1 | | 8/2020 | |
| GB | 717840 | A | | 11/1954 | |
| GB | 1066188 | A | | 4/1967 | |
| JP | 2008507619 | A | | 3/2008 | |
| JP | 2008127493 | A | * | 6/2008 | |
| JP | 2013247177 | A | | 12/2013 | |
| JP | 2014040085 | A | | 3/2014 | |
| JP | 2017030346 | A | | 2/2017 | |
| KR | 10-2014-0119785 | A | | 10/2014 | |
| WO | 2006020279 | A2 | | 2/2006 | |
| WO | 2006020279 | A3 | | 2/2006 | |
| WO | 2010045147 | A2 | | 4/2010 | |
| WO | 20120143182 | A1 | | 10/2012 | |
| WO | 2014072147 | A1 | | 5/2014 | |
| WO | 2015175682 | A1 | | 11/2015 | |
| WO | 2016059986 | A1 | | 4/2016 | |
| WO | WO-2016125860 | A1 | * | 8/2016 | .......... B29C 64/106 |
| WO | 2016185874 | A1 | | 11/2016 | |
| WO | 2016205690 | A1 | | 12/2016 | |
| WO | 2017112687 | A1 | | 6/2017 | |

(56) References Cited

FOREIGN PATENT DOCUMENTS

| | | | |
|---|---|---|---|
| WO | 2017167691 | A1 | 10/2017 |
| WO | 2020077127 | A1 | 4/2020 |

OTHER PUBLICATIONS

Final Rejection mailed Apr. 1, 2022 from U.S. Appl. No. 16/591,198, filed Oct. 2, 2019.
Communication pursuant to Article 94(3) EPC for European Application No. 16738251.4, dated Sep. 27, 2023.
Non-final Rejection from corresponding U.S. Appl. No. 15/591,198, mailed Jul. 19, 2022.
International Search Report and Written Opinion of PCT/US2019/055694, filed Oct. 10, 2019, mailed Mar. 6, 2020.
Prosecution history from corresponding U.S. Appl. No. 15/737,579, filed Dec. 18, 2017 including: Restriction Requirement mailed Oct. 22, 2019, Non-Final Rejection mailed Mar. 6, 2020, Non-Final Rejection mailed Nov. 30, 2020, Notice of Allowance mailed Jun. 11, 2021, Notice of Allowance mailed Jul. 9, 2021, Notice of Allowance mailed Sep. 15, 2021; and Notice of Allowance mailed Nov. 2, 2021.
Prosecution history for corresponding U.S. Appl. No. 15/729,410, filed Oct. 10, 2017 including: Notice of Allowance and Fee(s) Due mailed Dec. 11, 2020, Notice of Allowance and Fee(s) Due mailed Oct. 21, 2020, Non-Final Rejection mailed Apr. 2, 2020; and Restriction Requirement mailed Nov. 29, 2019.
Communication pursuant to Article 64(3) EPC from corresponding European Patent Application No. 16738251.4, dated Nov. 27, 2020.
International Search Report and Written Opinion dated Oct. 4, 2016 for corresponding International Application No. PCT/US2016/038140, filed Jun. 17, 2016.
International Preliminary Report on Patentability dated Dec. 19, 2017 for corresponding International Application No. PCT/US2016/038140, filed Jun. 17, 2016.
International Search Report and Written Opinion of PCT/US2018/055277, mailed Jan. 24, 2019.
Japanese Office Action dated Oct. 30, 2018 for corresponding Japanese Application No. 2017-564868, filed Dec. 14, 2017.
Canadian Office Action dated Nov. 14, 2018 for corresponding Canadian Application No. 2,989,059, filed Dec. 8, 2017.
Japanese Office Action dated Apr. 17, 2019 for corresponding Japanese Application No. 2017-564868, filed Dec. 14, 2017.
Korean Office Action dated Apr. 18, 2019 for corresponding Korean Application No. 10-2018-7001645, filed Jan. 18, 2018.
Canadian Office Action for CA 2,989,059, dated Jun. 17, 2019, 3 pages.
China Office Action, 201680035689.9, Nov. 5, 2019, 11 pages.
Communication pursuant to Article 94(3) EPC from corresponding European Patent Application No. 18797278.1, dated Oct. 6, 2021.
Prosecution history from U.S. Appl. No. 16/643,275, filed Feb. 28, 2020 including: Notice of Allowance and Fee(s) Due mailed Oct. 4, 2021, and Requirement for Restriction/Election mailed Jul. 6, 2021.
Prosecution history for U.S. Appl. No. 16/591,198 including: Non-Final Office Action mailed Dec. 8, 2021 and Restriction Requirement mailed Aug. 30, 2021.
Communication pursuant to Rules 161(1) and 162 EPC from European Patent Application No. 19797448.8, dated May 19, 2021, 3 pages.
Office Action from U.S. Appl. No. 17/234,319, dated Aug. 13, 2024.
"Paper Electrophoretic Studies of the Electrolytic Behavior of Quadrivalent Metal Ions", by K. Pan et al., Contributions from Department of Chemistry, National Taiwan University, 1960, pp. 85-101.
Communication pursuant to Article 94(3) EPC from corresponding European Patent Application No. 18797278.1, dated Sep. 19, 2024.
US Office Action from corresponding U.S. Appl. No. 18/583,995, dated Oct. 8, 2024.
Office Action from U.S. Appl. No. 18/583,995, dated May 2, 2025.
US Office Action from corresponding U.S. Appl. No. 18/583,995, dated Ocotber 14, 2025.
US Office Action from corresponding U.S. Appl. No. 18/307,354, dated Jan. 15, 2026.

* cited by examiner

WATER DISPERSIBLE POLYMER FOR USE IN ADDITIVE MANUFACTURING

CROSS-REFERENCE TO RELATED APPLICATION

This Application is a divisional of U.S. Ser. No. 15/737,579, filed Dec. 18, 2017, which is a Section 371 National Stage Application of International Application No. PCT/US2016/038140, filed Jun. 17, 2016 and published as WO/2016/205690 on Dec. 22, 2016, which claims priority to U.S. Patent Application No. 62/182,159, filed Jun. 19, 2015, the contents of each of which are hereby incorporated by reference in their entireties.

BACKGROUND

The present disclosure relates to additive manufacturing systems for printing three-dimensional (3D) parts and support structures. In particular, the present disclosure relates to support and build materials for use in additive manufacturing systems, and methods of using the support and build materials as consumables in additive manufacturing systems to print printed items.

Additive manufacturing is generally a process in which a three-dimensional (3D) object is manufactured utilizing a computer model of the objects. The basic operation of an additive manufacturing system consists of slicing a three-dimensional computer model into thin cross sections, translating the result into two-dimensional position data, and feeding the data to control equipment which manufacture a three-dimensional structure in a layerwise manner using one or more additive manufacturing techniques. Additive manufacturing entails many different approaches to the method of fabrication, including fused deposition modeling, ink jetting, selective laser sintering, powder/binder jetting, electron-beam melting, electrophotographic imaging, and stereolithographic processes. In a fused deposition modeling additive manufacturing system, a 3D part of model may be printed from a digital representation of the 3D part in a layer-by-layer manner by extruding a flowable part material along toolpaths. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane) after each layer is formed, and the process is then repeated to form a printed item resembling the digital representation.

In an electrophotographic 3D printing process, each slice of the digital representation of the 3D part and its support structure is printed or developed using an electrophotographic engine. The electrophotographic engine generally operates in accordance with 2D electrophotographic printing processes, but with a polymeric toner. The electrophotographic engine typically uses a conductive support drum that is coated with a photoconductive material layer, where latent electrostatic images are formed by electrostatic charging, followed by image-wise exposure of the photoconductive layer by an optical source. The latent electrostatic images are then moved to a developing station where the polymeric toner is applied to charged areas, or alternatively to discharged areas of the photoconductive insulator to form the layer of the polymeric toner representing a slice of the 3D part. The developed layer is transferred to a transfer medium, from which the layer is transfused to previously printed layers with heat and/or pressure to build the 3D part.

In fabricating printed items by depositing layers of a part material, supporting layers or structures are typically built underneath overhanging portions or in cavities of printed items under construction, which are not supported by the part material itself. A support structure may be built utilizing the same deposition techniques by which the part material is deposited. A host computer generates additional geometry acting as a support structure for the overhanging or free-space segments of the 3D part being formed. The support material adheres to the part material during fabrication, and is removable from the completed printed item when the printing process is complete. Prior art methods of removing support structure have included simply breaking the support structure off of the part material and then smoothing out any residual rough areas, or dissolving away soluble supports using a water-based solution. It is desirable to have a support structure that can be removed without special tool or solutions, and with minimal labor. A more easily removable support structure reduces time of manufacture of the part in addition to making the process of removing the support structure easier.

SUMMARY

A water dispersible sulfopolymer for use as a sacrificial support material in the layer-wise additive manufacture of a printed part made of a non water dispersible polymer, wherein the water dispersible polymer is a reaction product of a sulfo monomer, the water dispersible sulfopolymer being dispersible in water resulting in separation of the water dispersible polymer from the part made of the non water dispersible polymer.

In another aspect, a water dispersible sulfopolymer is supplied as a sacrificial support material in the layer-wise additive manufacture of a printed part made of a non water dispersible polymer. The water dispersible polymer has a heat deflection temperature within ±20° C. of the heat deflection temperature of the non water dispersible polymer or preferably within ±15° C. of the heat deflection temperature of the non water dispersible polymer, wherein the water dispersible polymer is a reaction product of a sulfo monomer, the water dispersible sulfopolymer being dispersible in water resulting in separation of the water dispersible polymer from the part made of the non water dispersible polymer.

In another aspect, a water dispersible sulfopolymer is supplied as a sacrificial support material in the layer-wise additive manufacture of a printed part made of a non water dispersible polymer. The water dispersible polymer has a glass transition temperature within ±20° C. of the glass transition temperature of the non water dispersible polymer or preferably within ±15° C. of the glass transition temperature of the non water dispersible polymer, wherein the water dispersible polymer is a reaction product of a metal sulfo monomer, the water dispersible sulfopolymer being dispersible in water resulting in separation of the water dispersible polymer from the part comprising the non water dispersible polymer.

In another aspect, the water dispersible sulfopolymer is a reaction product of a metal sulfo-monomer.

In yet another aspect of this disclosure, the water dispersible sulfopolymer has a charge density of at least approximately 0.4 meq./g, such that the water dispersible sulfopolymer is dispersible in water resulting in separation of the water dispersible sulfopolymer from the part comprising the non water dispersible polymer.

In a further aspect of this disclosure, the water dispersible sulfopolymer is used in a method of manufacturing a sacrificial support structure for use with a 3D printed part made of the non water dispersible polymer. The method of manufacturing comprises printing the support structure as a series of successive layers of the water dispersible sulfopolymer, the water dispersible sulfopolymer having a glass transition temperature wherein the water dispersible polymer has a glass transition temperature within ±20° C. of the glass transition temperature of the non water dispersible polymer or preferably within ±15° C. of the glass transition temperature of the non water dispersible polymer, wherein the water dispersible polymer is a reaction product of a sulfo monomer, and separating the non water dispersible polymer from the water dispersible sulfopolymer by subjecting the water dispersible sulfopolymer to water.

In a further aspect of this disclosure, the water dispersible sulfopolymer is used in a method of manufacturing a sacrificial support structure for use with a part made of the non water dispersible polymer. The method of manufacturing comprises printing the support structure as a series of successive layers with the water dispersible sulfopolymer, the water dispersible sulfopolymer having a heat deflection temperature wherein the water dispersible polymer has a heat deflection temperature within ±20° C. of the heat deflection temperature of the non water dispersible polymer or preferably within ±15° C. of the heat deflection temperature of the non water dispersible polymer, wherein the water dispersible polymer is a reaction product of a sulfo monomer, and separating the non water dispersible polymer from the water dispersible sulfopolymer by subjecting the water dispersible sulfopolymer to water.

In another aspect of this disclosure the water dispersible sulfopolymer preferably has approximately 18 to 40% metal sulfoisophthalic monomer, with a more preferred range of approximately 20 to 35% metal sulfoisophthalic monomer and most preferably approximately 25 to 35% metal sulfoisophthalic monomer.

In a further aspect, the water dispersible polymer of this disclosure is a sulfopolymer which is also substantially amorphous.

Definitions

Unless otherwise specified, the following terms as used herein have the meanings provided below:

The term "polymer" refers to a polymerized molecule having one or more monomer species, and includes homopolymers and copolymers. The term "copolymer" refers to a polymer having two or more monomer species, and includes terpolymers (i.e., copolymers having three monomer species).

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Reference to "a" chemical compound refers to one or more molecules of the chemical compound, rather than being limited to a single molecule of the chemical compound. Furthermore, the one or more molecules may or may not be identical, so long as they fall under the category of the chemical compound. Thus, for example, "a" polyester is interpreted to include one or more polymer molecules of the polyester, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one polyester", "one or more polyesters", and "polyester(s)" may be used interchangeably and have the same meaning.

The terms "about", approximately and "substantially" are used herein with respect to measurable values and ranges due to expected variations known to those skilled in the art (e.g., limitations and variability in measurements).

The term "providing", such as when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

"Soluble" as referred to herein can be used interchangeably with "disintegrable" and "dissolvable" and relates to materials that disintegrate in a solution or dispersion. Upon disintegration, the water dispersible material can break apart into smaller pieces and/or particles of polymer in the solution or dispersion. Some or all of the water dispersible material may also dissolve into the solution or dispersion upon disintegration.

"Water soluble" as used herein relates to materials that dissolve in tap water that is about neutral pH. It is understood that the pH of tap water can vary depending on the municipality and as such the pH can vary between about 5 and about 9. Although these pH's are slightly basic or slightly acidic, the defining feature of the water soluble materials is that they do not require an acidic or basic solution to disintegrate and can disintegrate in water at about neutral pH, e.g. tap water.

"High temperature build environment" as referred to herein relates to build environments of about 45° C. or greater in additive manufacturing systems.

"Heat deflection temperature" or "heat distortion temperature" (HDT) is the temperature at which a polymer sample deforms under a specified load and is determined by the test procedure outlined in ASTM D648.

"Thermally stable" as referred to herein relates to the material having a heat deflection temperature sometimes referred to as heat distortion temperature (HDT) compatible with the desired build environment such that they do not exceed their thermal-degradation kinetics thresholds.

The term "polyester" referred to herein relates to a polymer that contains an ester functional group in its main chain. As used herein, the term "sulfopolyester" means any polyester that contains a sulfomonomer.

The term "polyamide" referred to herein relates to both aliphatic and aromatic polyamides. In the case of an aliphatic polyamide such as nylon 6 and nylon 66, the amide link is produced from the condensation reaction of an amino group and a carboxylic acid group wherein water is eliminated. For aromatic polyamides or 'aramids' such as Kevlar, an acid chloride is used as a monomer. As used herein, the term "sulfopolyamide" means any polyamide that contains a sulfomonomer.

The term "polyurethane" referred to herein relates to polymers that are most commonly formed by reacting a di- or polyisocyanate with a polyol. As used herein, the term "sulfopolyurethane" means any polyurethane that contains a sulfomonomer.

The term "polyesteramide" referred to herein relates to polymers that contain an ester and an amide functional group in its main chain. For example, it can be achieved by combining a di-acid and a diol with a diamine, or a hydroxy-carboxylic acid and an amine, or an aminocarboxylic acid and a diol. As used herein, the term "Sulfopolyesteramide means any polyesteramide that contains a sulfomonomer.

DETAILED DESCRIPTION

Figure 1:
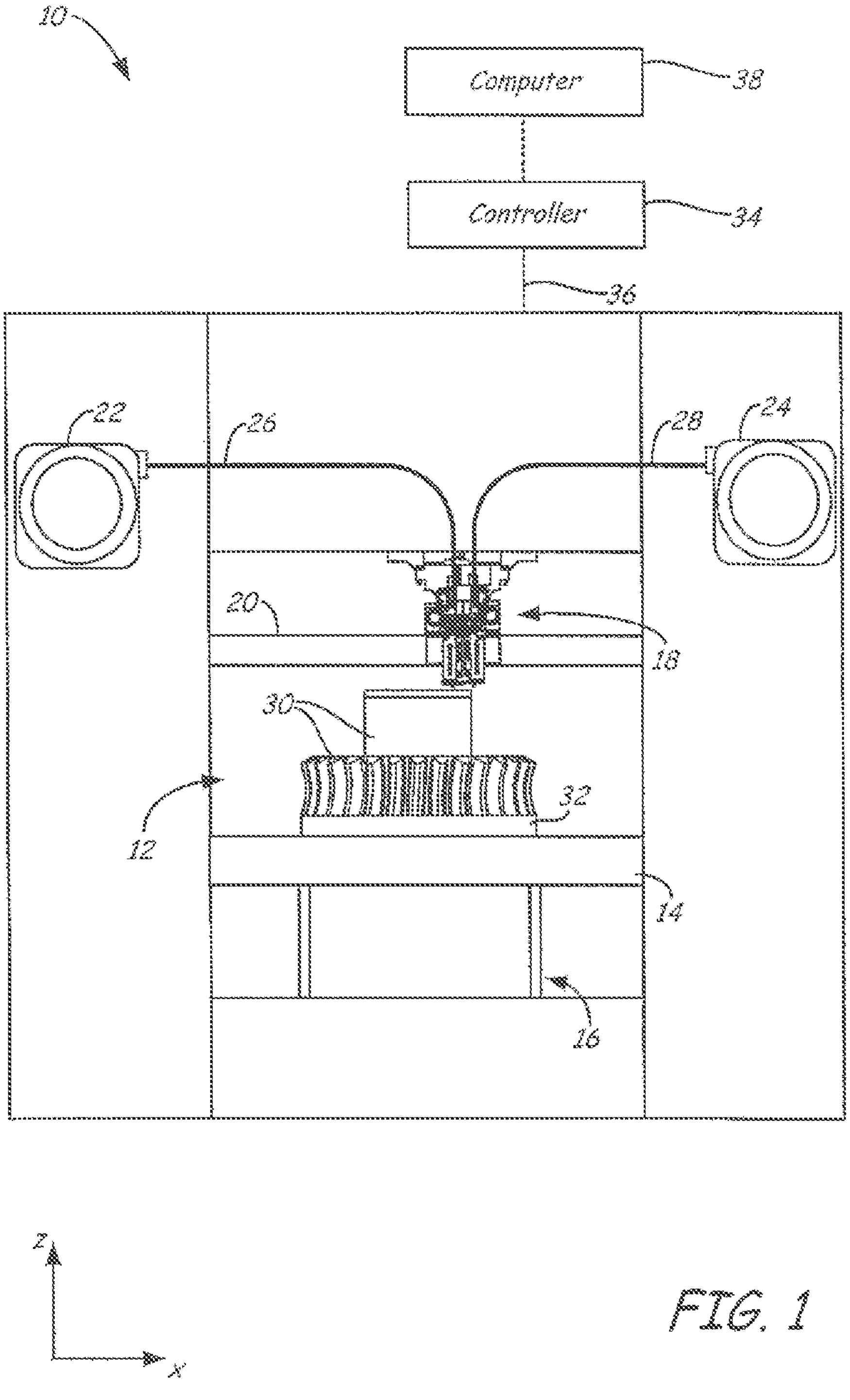
FIG. 1 is a front view of an extrusion-based additive manufacturing system configured to print printed parts and support structures, where the support structures are printed from a water dispersible material of the present disclosure.

The present disclosure is directed to a water dispersible sulfopolymer material for use in 3D printing. The sulfopolymer material can be used for printing sacrificial support structures for 3D parts built in a range of build temperature environments of additive manufacturing systems. It can also be used for layer-wise printing of dissolvable 3D parts.

The water dispersible material of the present disclosure functions as a sacrificial material for an associated part material in additive manufacturing (aka 3D printing) applications. A sacrificial support material can be desirable where overhanging features are required, where significant angular slopes exist in the printed items and where it is essential to also preserve delicate features in the printed item, such as small orifices or controlled pore structures, and in some situations, to laterally encase the printed item. Once the item has been printed, the support structure of the water dispersible material is removed to reveal the completed printed item without damaging any of the critical or delicate geometrical features of the printed item. To accomplish this removal, the disclosed material is water dispersible, allowing the support structure to be at least partially and typically completely dissolved away from the printed item. The support structure made be made solely of the water dispersible polymer of this disclosure or other non-dispersible polymers may be incorporated therein as long as the water dispersibility is not substantially affected. In addition mixtures of other sulfopolymers, water-soluble polymers, and non-soluble polymers; additives, fillers, and/or stabilizers may be added to the water dispersible polymer.

The present disclosure also includes the use of the water dispersible polymer for manufacturing a dissolvable part suitable for downstream uses such as sacrificial tooling. A sacrificial tool encompassing the water dispersible polymer may be a dissolvable core type structure on which a part or device is subsequently produced or providing some type of platform for subsequent manufacture of a part or device. Such a process is distinguished from for example a direct additive manufacturing process wherein both the part and the support structure are concurrently printed. For example a device made of carbon fibers may be formed around the sacrificial tooling made of the water dispersible polymer. Once the carbon fiber device is made, the water dispersible polymer is disintegrated by introducing the water dispersible polymer to water.

The water used to disperse the water dispersible polymer is plain tap or naturally occurring water. Support removal does not require the presence of a basic or acidic environment or heating of the aqueous solution. In addition, the solubility of the water dispersible material is sufficient for use of removal of the supports in an automated process or hands-free manner. Plain tap water typically has an average pH of approximately 7. However, water pH varies greatly, ranging anywhere from having a pH between approximately 5.0 and 9 is also suitable. In any event, the pH of the water does not need to be adjusted to disintegrate the water dispersible polymer. After it disintegrates, the dispersed water soluble polymer solution may be processed by increasing the ionic strength of the solution to precipitate out the water dispersible polymer. The water (with the water soluble polymer removed) may then be recycled for reuse to remove the water dispersible polymer from subsequent parts.

In the embodiment of additive manufacturing, in order to effectively print a support structure in a layer-by-layer manner in coordination with a printed item for example in a fused deposition modeling process, amorphous support materials preferably have a glass transition temperature that is approximately equivalent to or higher than the Tg of the part material. For example a Tg of ±20 C with a more preferred range of ±15 C of the support material with respect to the Tg of the part material would be considered approximately equivalent. This allows the part and support materials to have similar heat deflection temperatures and other thermal characteristics when printed together as a material pair. For example, similar glass transition and heat deflection temperatures allow the part and support materials to be printed together in the same heated environment while preventing excessive distortions and curling. For semi-crystalline or crystalline support materials, heat deflection temperature is more indicative of acceptable performance than Tg pairing of part and support materials. Semi-crystalline or crystalline support materials are more suitable for particulate additive manufacturing such as selective laser sintering, or electrophotographic imaging. An example of suitably equivalent heat deflection temperatures are ±20° C. with a more preferred range of ±15° C.

The water dispersible material of the present disclosure may be configured for use with several different additive manufacturing techniques, such as extrusion-based additive manufacturing systems, high-speed sintering systems, selective laser sintering systems, electrophotography-based additive manufacturing systems, and the like.

Depending on the additive manufacturing technique selected, it may be desired to customize the level of crystallinity of the polymeric material. For example, in SLS or other sintering applications, crystallinity is desired. In FDM applications, it is more desirable to use amorphous polymeric materials. The level of crystallinity can be manipulated during manufacture of the material via monomer selection.

As shown in FIG. 1, system 10 is an example of an extrusion-based additive manufacturing system for printing or otherwise building 3D parts and support structures using a layer-based, additive manufacturing technique, where the support structures may be printed from the water dispersible material of the present disclosure. Suitable extrusion-based additive manufacturing systems for system 10 include fused deposition modeling systems developed by Stratasys, Inc., Eden Prairie, MN under the trademark "FDM".

In the illustrated embodiment, system 10 includes chamber 12, platen 14, platen gantry 16, print head 18, head gantry 20, and consumable assemblies 22 and 24. Chamber 12 is an enclosed environment that contains platen 14 for printing printed parts and support structures. Chamber 12 may be heated (e.g., with circulating heated air) to reduce the rate at which the part and support materials solidify after being extruded and deposited.

Alternatively, the heating may be localized rather than in an entire chamber 12. For example, the deposition region may be heated in a localized manner. Example techniques for locally heating a deposition region include heating platen 14 and/or with directing heat air jets towards platen 14 and/or the printed parts/support structures being printed). The heating anneals the printed layers of the printed parts (and support structures) to partially relieve the residual stresses, thereby reducing curling of the printed parts and support structures.

Platen 14 is a platform on which printed parts and support structures are printed in a layer-by-layer manner. In some embodiments, platen 14 may also include a flexible polymeric film or liner on which the printed parts and support structures are printed. In the shown example, print head 18 is a dual-tip extrusion head configured to receive consumable filaments from consumable assemblies 22 and 24 (e.g., via guide tubes 26 and 28) for printing printed part 30 and support structure 32 on platen 14. Consumable assembly 22 may contain a supply of a part material, such as a high-performance part material, for printing printed part 30 from the part material. Consumable assembly 24 may contain a supply of a support material of the present disclosure for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12.

In an alternative embodiment, platen 14 may be configured to move in the horizontal x-y plane within chamber 12, and print head 18 may be configured to move along the z-axis. Other similar arrangements may also be used such that one or both of platen 14 and print head 18 are moveable relative to each other. Platen 14 and print head 18 may also be oriented along different axes. For example, platen 14 may be oriented vertically and print head 18 may print printed part 30 and support structure 32 along the x-axis or the y-axis.

System 10 also includes controller 34, which is one or more control circuits configured to monitor and operate the components of system 10. For example, one or more of the control functions performed by controller 34 can be implemented in hardware, software, firmware, and the like, or a combination thereof. Controller 34 may communicate over communication line 36 with chamber 12 (e.g., with a heating unit for chamber 12), print head 18, and various sensors, calibration devices, display devices, and/or user input devices.

System 12 and/or controller 34 may also communicate with computer 38, which is one or more computer-based systems that communicates with system 12 and/or controller 34, and may be separate from system 12, or alternatively may be an internal component of system 12. Computer 38 includes computer-based hardware, such as data storage devices, processors, memory modules, and the like for generating and storing tool path and related printing instructions. Computer 38 may transmit these instructions to system 10 (e.g., to controller 34) to perform printing operations.

Figure 2:
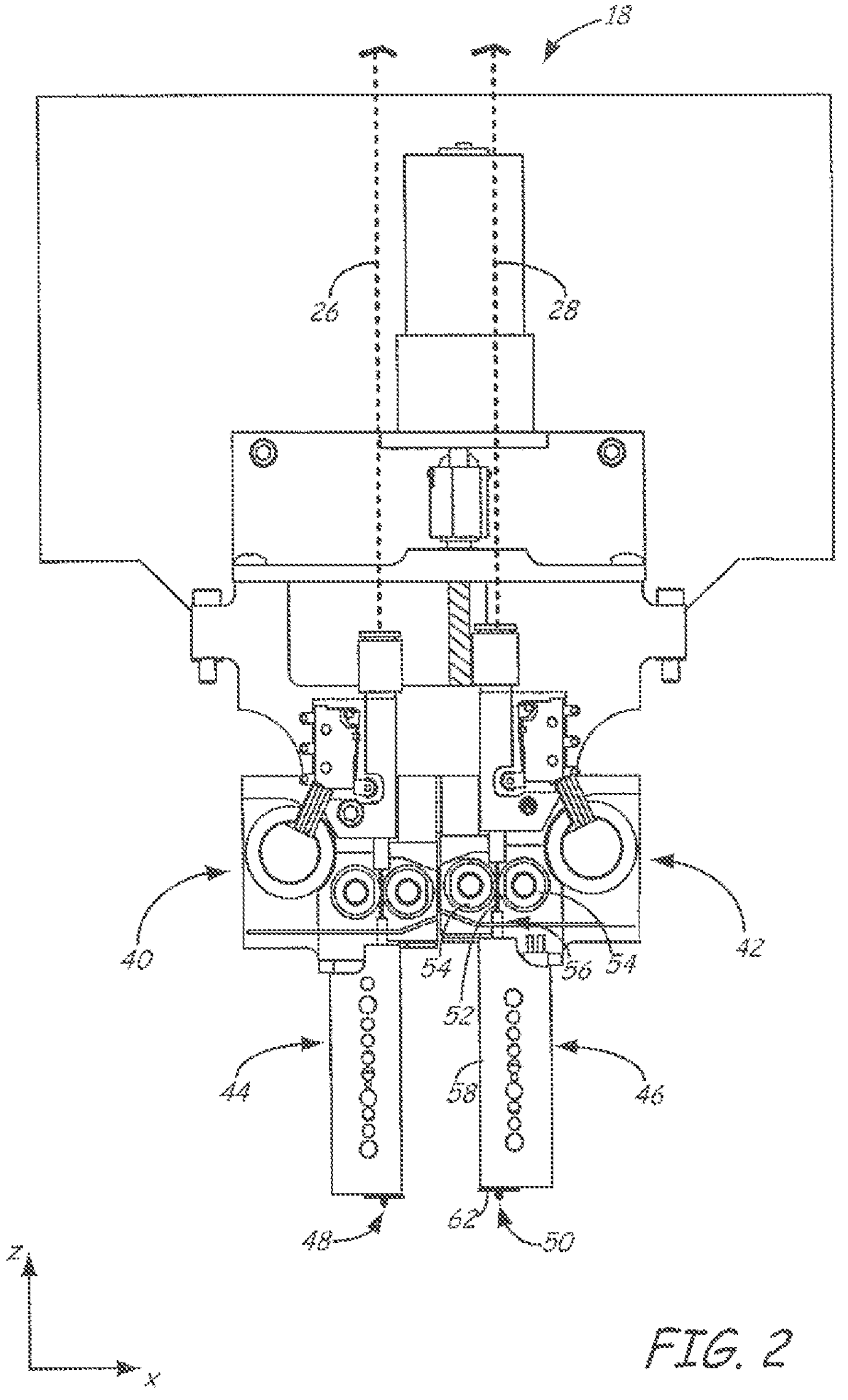
FIG. 2 is a front view of a print head of the extrusion-based additive manufacturing system.

FIG. 2 illustrates a suitable dual-tip device for print head 18, as described in Leavitt, U.S. Pat. No. 7,625,200. Additional examples of suitable devices for print head 18, and the connections between print head 18 and head gantry 20 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625,200; Batchelder et al., U.S. Pat. No. 7,896,209; Comb et al., U.S. Pat. No. 8,153,182; and Swanson et al., U.S. Pat. Nos. 8,419,996 and 8,647,102.

Figure 3:
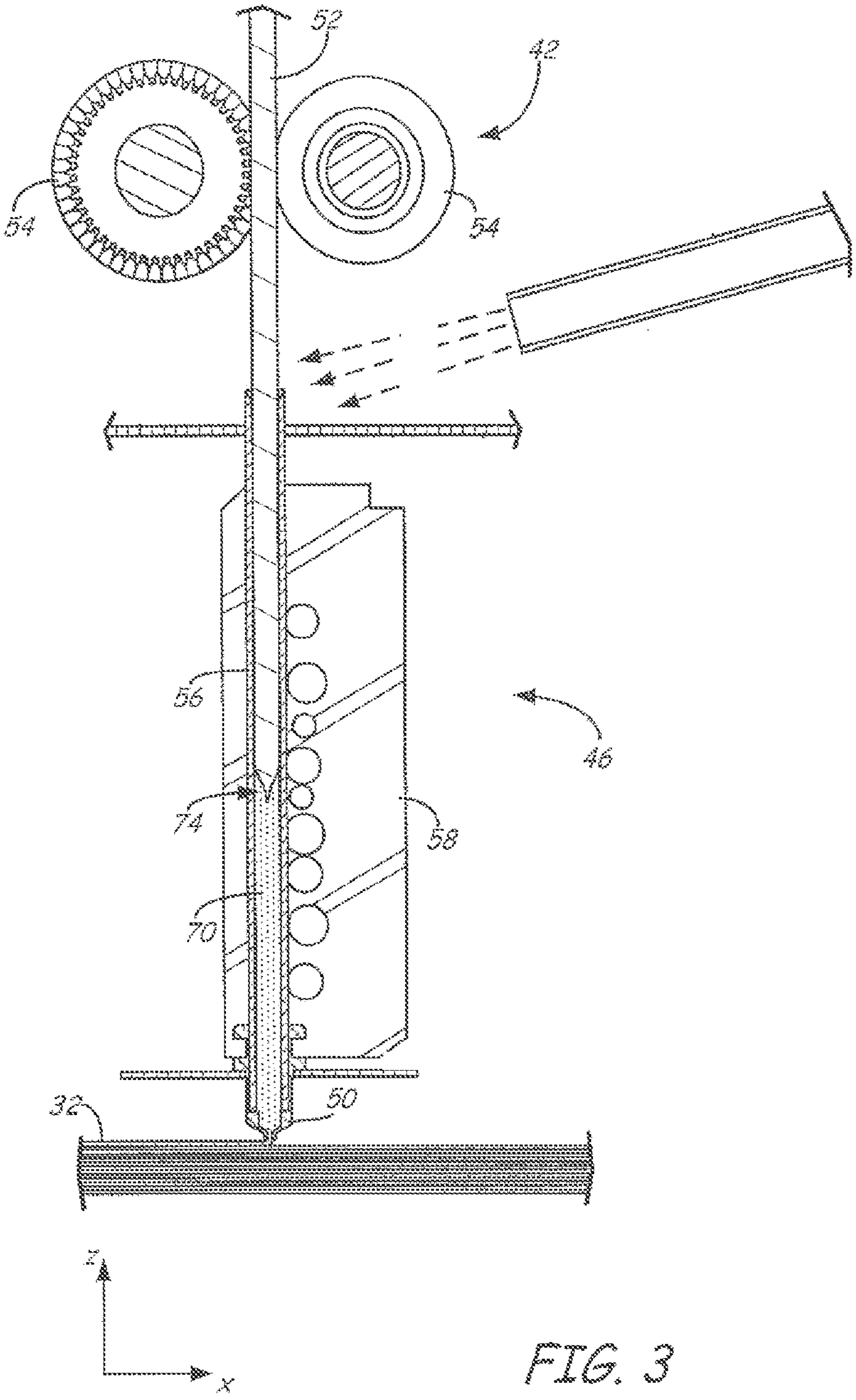
FIG. 3 is an expanded sectional view of a drive mechanism, a liquefier assembly, and a nozzle of the print head for use in the extrusion-based additive manufacturing system.

In the shown embodiment, print head 18 includes two drive mechanisms 40 and 42, two liquefier assemblies 44 and 46, and two nozzles 48 and 50, where drive mechanism 40, liquefier assembly 44, and nozzle 48 are for receiving and extruding the part material, and drive mechanism 42, liquefier assembly 46, and nozzle 50 are for receiving and extruding the support material of the present disclosure. In this embodiment the part material and the support material each preferably have a filament geometry for use with print head 18. For example, as shown in FIGS. 2 and 3, the support material may be provided as filament 52. During operation, controller 34 may direct wheels 54 of drive mechanism 42 to selectively draw successive segments filament 52 (of the support material) from consumable assembly 24 (via guide tube 28), and feed filament 52 to liquefier assembly 46. In alternative embodiments, the consumable material may be provided in other geometries or formats adapted for other types of print heads and feed systems, such as powder, liquid, pellet, slug, or ribbon forms.

Liquefier assembly 46 is heated to melt the provided consumable material to form melt 70. Preferred liquefier temperatures will vary depending on the particular polymer composition of the consumable material, and are preferably above the melt processing temperature of the material. The molten portion of the material (i.e., melt 70) forms meniscus 74 around the unmelted portion of filament 52. During an extrusion of melt 70 through nozzle 50, the downward movement of filament 52 functions as a viscosity pump to extrude the support material of melt 70 out of nozzle 50 as extruded roads, to thereby print support structure 32 in a layer-by-layer manner in coordination with the printing of printed part 30. After the print operation is complete, the resulting printed part 30 and support structure 32 may be removed from chamber 12. Support structure 32 may then be sacrificially removed from printed part 30, such as by dissolution in tap water.

The compositions of the present invention may also be provided in powder form for use in additive manufacturing systems that use powder-based consumables, e.g., electrophotography-based additive manufacturing systems and selective laser sintering systems. Electrophotography-based additive manufacturing systems are disclosed, for example, in Hanson et al., U.S. Publication Nos. 2013/0077996 and 2013/0077997, and Comb et al., U.S. Publication Nos. 2013/0186549 and 2013/0186558. Powder materials for use in EP-based AM systems have a particle size distribution ranging from about 5 micrometers to about 30 micrometers, have a heat deflection temperature of up to about 150 deg. C, and include a charge control agent. The addition of a charge control agent to polymer powders for EP-based systems is disclosed in Orrock et al., U.S. Publication No. 20150024316, the disclosure of which is incorporated by reference to the extent that it does not conflict with the present disclosure.

In an exemplary electro-photography based additive manufacturing system, each layer or partial thickness layer may be developed using electrophotography and carried from an electrophotography (EP) engine by a transfer medium (e.g., a rotatable belt or drum). The layer or partial thickness layer includes part material, and optionally support material. The partial thickness layer is then transferred to a build platform to print the 3D part (or support structure) in a layer-by-layer manner, where the successive partial thickness layers are transfused together to produce the 3D part (or support structure). Printing with partial thickness layers increases the resolution of the 3D part in the z direction relative to 3D parts printed with layers having the thickness of the nominal thickness of the slice.

Figure 4:
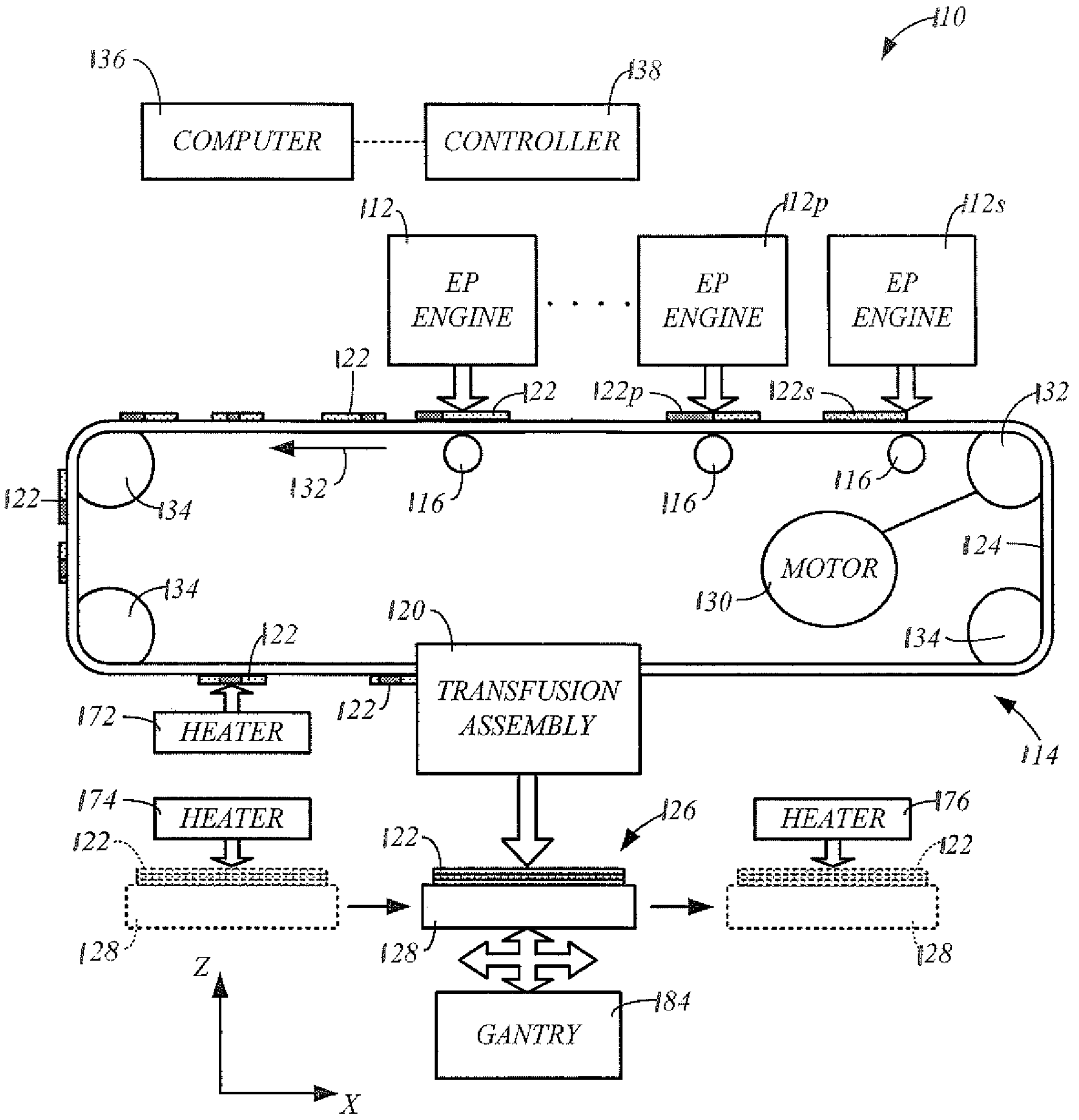
FIG. 4 is a simplified diagram of an exemplary electrophotography-based additive manufacturing system for printing 3D parts and associated support structures, in accordance with embodiments of the present disclosure.

FIG. 4 is a simplified diagram of an exemplary electrophotography-based additive manufacturing system 110 for printing 3D parts and associated support structures. As shown in FIG. 4, system 110 includes one or more EP engines, generally referred to as 112, such as EP engines 112*p* and 112*s*, a transfer assembly 114, biasing mechanisms 116, and a transfusion assembly 120. Examples of suitable components and functional operations for system 110 include those disclosed in Hanson et al., U.S. Pat. Nos. 8,879,957 and 8,488,994, and in Comb et al., U.S. Patents Nos. 2013/0186549 and 2013/0186558.

The EP engines 112*p* and 112*s* are imaging engines for respectively imaging or otherwise developing layers, generally referred to as 122, of the powder-based part and support materials. As discussed below, the developed layers 122 are transferred to a transfer medium 124 of the transfer assembly 114, which delivers the layers 122 to the transfusion assembly 120. The transfusion assembly 120 operates to build the 3D part 126, which may include support structures and other features, in a layer-by-layer manner by transfusing the layers 122 together on a build substrate 128.

The transfer assembly 114 includes one or more drive mechanisms that include, for example, a motor 130 and a drive roller 133, or other suitable drive mechanism, and operate to drive a transfer medium or belt 124 in a feed direction 132. The transfer assembly 114 includes idler rollers 134 that provide support for the belt 124. The EP engine 112*s* develops layers of powder-based support material, and the EP engine 112*p* develops layers of powder-based part material.

System 110 also includes controller 136, which represents one or more processors that are configured to execute instructions, which may be stored in memory of the system 110 to control components of the system 110 to perform one or more functions described herein.

The host computer 138 may include one or more computer-based systems that are configured to communicate with controller 136 to provide the print instructions and other operating information.

Figure 5:
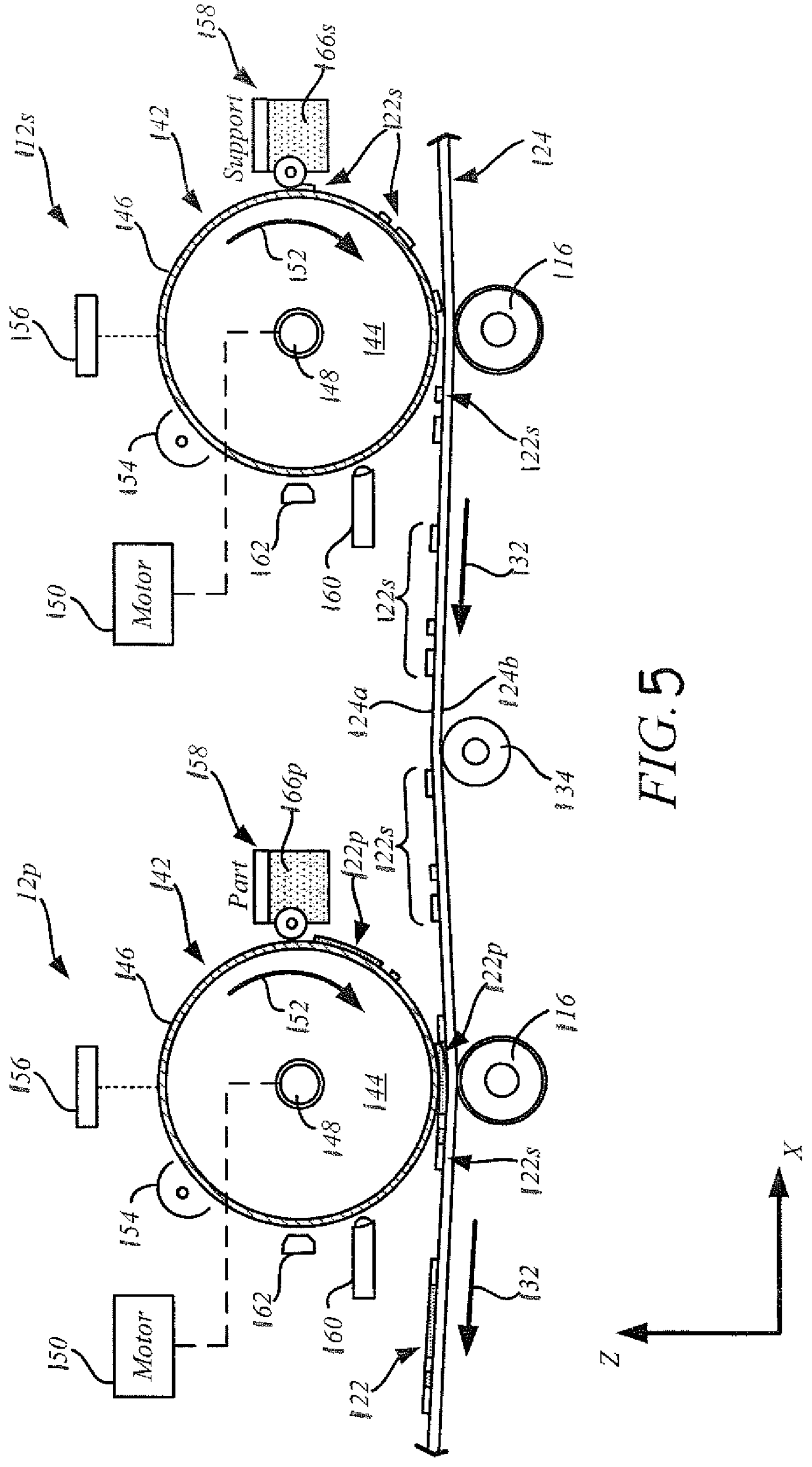
FIG. 5 is a schematic front view of a pair of exemplary electrophotography engines of the system for developing layers of the part and support materials.
Figure 6:
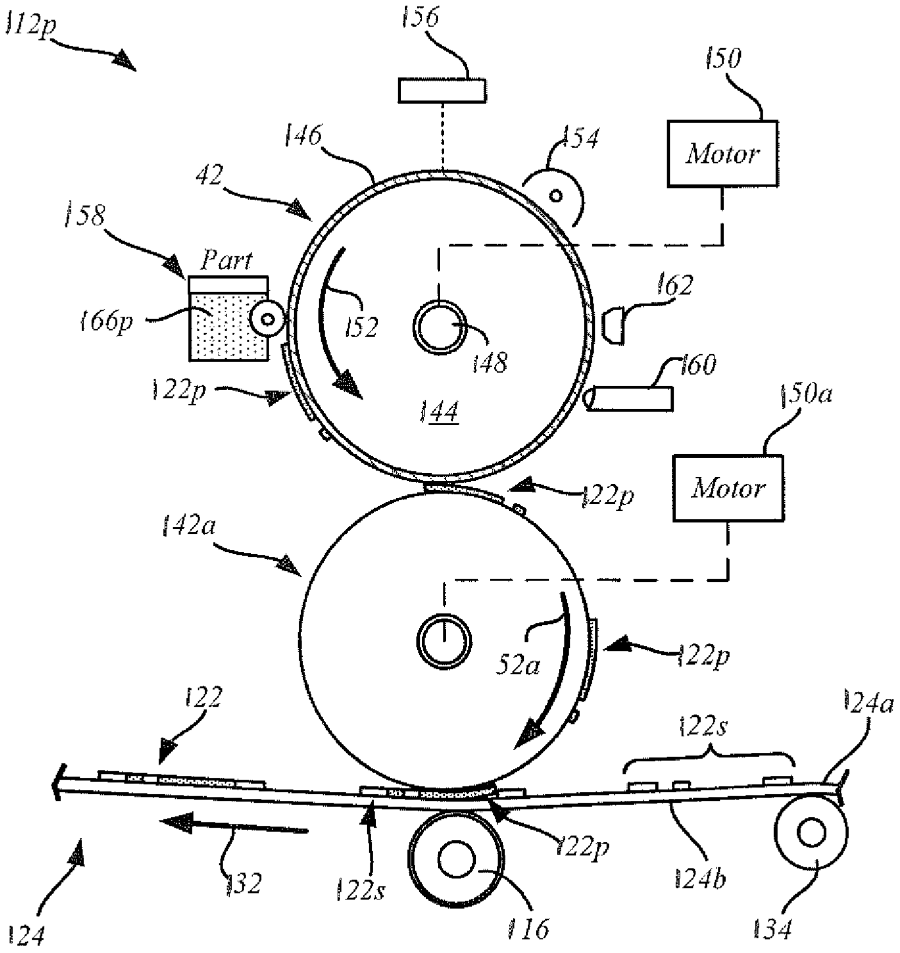
FIG. 6 is a schematic front view of an exemplary electrophotography engine, which includes an intermediary drum or belt.

FIG. 5 is a schematic front view of the EP engines 112*s* and 112*p* of the system 110. The EP engines 112*p* and 112*s* may include the same components, such as a photoconductor drum 142 having a conductive drum body 144 and a photoconductive surface 146 and configured to rotate around a shaft 148. The shaft 148 is correspondingly connected to a drive motor 150, which is configured to rotate the shaft 148 (and the photoconductor drum 142) in the direction of arrow 152 at a constant rate.

The surface 146 is configured to receive latent-charged images of the sliced layers of a 3D part or support structure (or negative images), and to attract charged particles of the part or support material to the charged or discharged image areas, thereby creating the layers of the 3D part or support structure.

As further shown, each of the exemplary EP engines 112*p* and 112*s* also includes a charge inducer 154, an imager 156, a development station 158, a cleaning station 160, and a discharge device 162, each of which may be in signal communication with the controller 136. The charge inducer 154, the imager 156, the development station 158, the cleaning station 160, and the discharge device 162 accordingly define an image-forming assembly for the surface 146 while the drive motor 150 and the shaft 148 rotate the photoconductor drum 142 in the direction 152.

The EP engines 112 use the powder-based material generally referred to herein as 166, to develop or form the layers 122. The image-forming assembly for the surface 146 of the EP engine 112*s* is used to form support layers 122*s* of the powder-based support material 166*s*, where a supply of the support material 166*s* may be retained by the development station 158 (of the EP engine 112*s*) along with carrier particles. Similarly, the image-forming assembly for the surface 146 of the EP engine 112*p* is used to form part layers 122*p* of the powder-based part material 166*p*, where a supply of the part material 166*p* may be retained by the development station 158 (of the EP engine 112*p*) along with carrier particles.

The charge inducer 154 is configured to generate a uniform electrostatic charge on the surface 146 as the surface 146 rotates in the direction 152 past the charge inducer 154.

The imager 156 is a digitally-controlled, pixel-wise light exposure apparatus configured to selectively emit electromagnetic radiation toward the uniform electrostatic charge on the surface 146 as the surface 146 rotates in the direction 152 the part imager 156. The selective exposure of the electromagnetic radiation to the surface 146 is directed by the controller 36, and causes discrete pixel-wise locations of the electrostatic charge to be removed (i.e., discharged to ground), thereby forming latent image charge patterns on the surface 146.

Suitable devices for the imager 156 include scanning laser (e.g., gas or solid state lasers) light sources, light emitting diode (LED) array exposure devices, and other exposure device conventionally used in 2D electrophotography systems. In alternative embodiments, suitable devices for the charge inducer 154 and the imager 156 include ion-deposition systems configured to selectively directly deposit charged ions or electrons to the surface 46 to form the latent image charge pattern.

Each development station 158 is an electrostatic and magnetic development station or cartridge that retains the supply of the part material 166*p* or the support material 166*s*, along with carrier particles. When agitated, the carrier particles generate triboelectric charges to attract the powders of the part material 166*p* or the support material 166*s*, which charges the attracted powders to a desired sign and magnitude, as discussed below.

Each development station 158 may also include one or more devices for transferring the charged part or the support material 166*p* or 166*s* to the surface 146, such as conveyors, fur brushes, paddle wheels, rollers, and/or magnetic brushes. The photoconductor drum 112 rotates in the direction 152, where successive layers 122*p* or 122*s* correspond to the successive sliced layers of the digital representation of the 3D part or support structure. The successive layers 122*p* or 122*s* are then rotated with the surface 146 in the direction 152 to a transfer region in which layers 122*p* or 122*s* are successively transferred from the photoconductor drum 142 to the belt 124 or other transfer medium.

After a given layer 122*p* or 122*s* is transferred from the photoconductor drum 142 to the belt 124 (or an intermediary transfer drum or belt), the drive motor 150 and the shaft 148 continue to rotate the photoconductor drum 142 in the direction 152 such that the region of the surface 146 that previously held the layer 122*p* or 122*s* passes the cleaning station 160.

After passing the cleaning station 160, the surface 146 continues to rotate in the direction 152 such that the cleaned regions of the surface 146 past the discharge device 162 to remove any residual electrostatic charge on the surface 146, prior to starting the next cycle.

The biasing mechanisms 116 are configured to induce electrical potentials through the belt 124 to electrostatically attract the layers 122*p* and 122*s* from the EP engines 112*p* and 112*s* to the belt 124. Because the layers 122*p* and 122*s* are each only a single layer increment in thickness at this point in the process, electrostatic attraction is suitable for transferring the layers 122*p* and 122*s* from the EP engines 112*p* and 112*s* to the belt 124.

The controller 136 preferably rotates the photoconductor drums 136 of the EP engines 112*p* and 112*s* at the same rotational rates that are synchronized with the line speed of the belt 124 and/or with any intermediary transfer drums or belts. This allows the system 110 to develop and transfer the layers 122*p* and 122*s* in coordination with each other from separate developer images. In particular, as shown, each part layer 122*p* may be transferred to the belt 124 with proper registration with each support layer 122*s* to produce a combined part and support material layer, which is generally designated as layer 122. As can be appreciated, some of the layers 122 transferred to the layer transfusion assembly 120 may only include support material 166*s* or may only include part material 166*p*, depending on the particular support structure and 3D part geometries and layer slicing.

Figure 7:
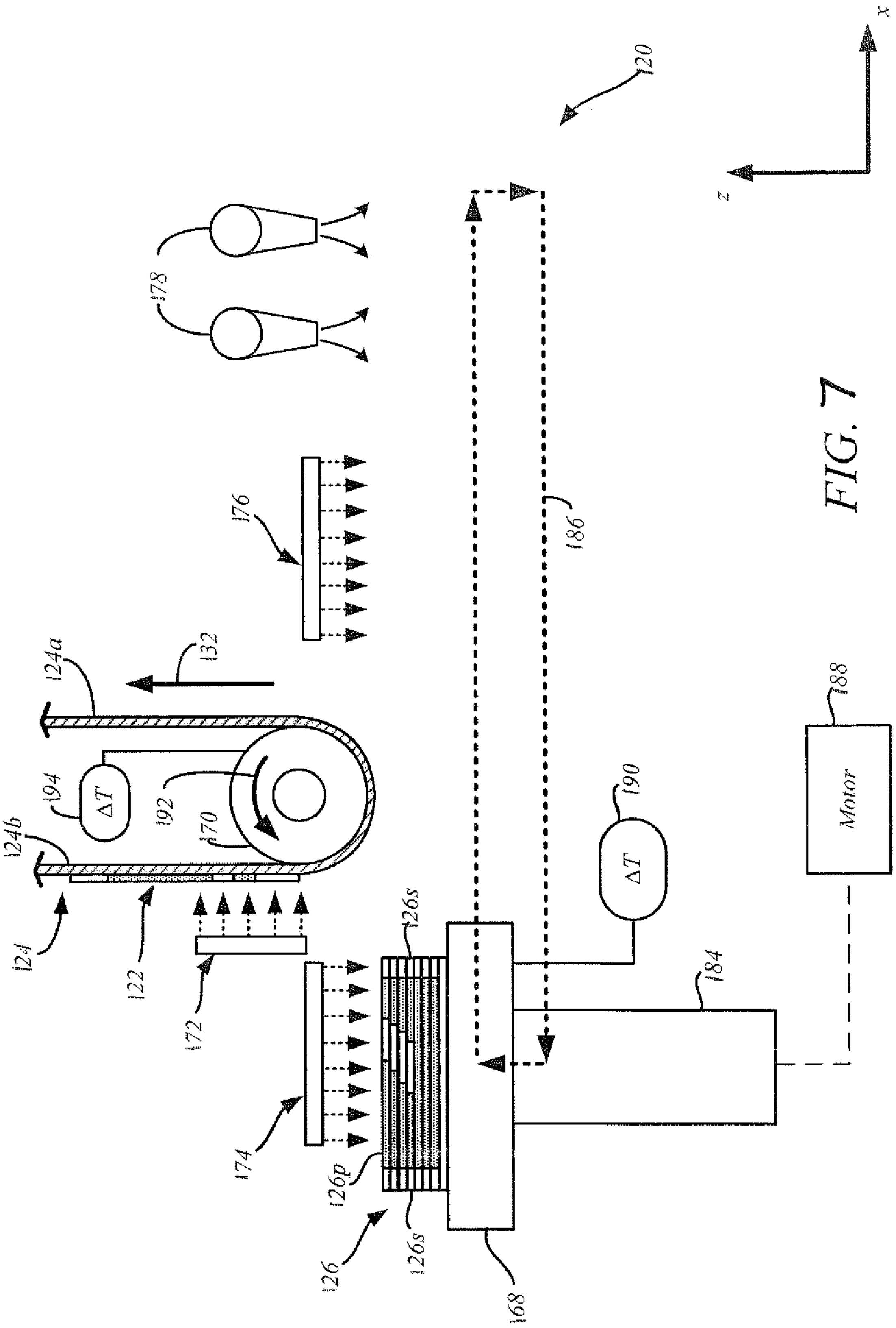
FIG. 7 is a schematic front view of an exemplary transfusion assembly of the system for performing layer transfusion steps with the developed layers.

FIG. 7 illustrates the transfusion assembly 120 which includes the build platform 128, a nip roller 170, pre-transfusion heaters 172 and 174, an optional post-transfusion heater 176, and air jets 178. The build platform 128 is configured to receive the heated combined layers 122 (or separate layers 122*p* and 122*s*) for printing the part 126, which includes a 3D part 126*p* formed of the part layers 122*p*, and support structure 126*s* formed of the support layers 122*s*, in a layer-by-layer manner.

The build substrate 128 is supported by a gantry 184 or other suitable mechanism, which is configured to move the build platform 128 along the z-axis and the x-axis, as illustrated schematically in FIG. 4. The gantry 184 may be operated by a motor 188 based on commands from the controller 136.

The build substrate 128 is heatable with heating element 190 configured to heat and maintain the build platform 128 at an elevated temperature that is greater than room temperature (25° C.), such as at a desired average part temperature of 3D part 126*p* and/or support structure 126*s*, as discussed in Comb et al., U.S. Patent Application Publication Nos. 2013/0186549 and 2013/0186558. This allows the build platform 128 to assist in maintaining 3D part 126*p* and/or support structure 26*s* at this average part temperature.

The nip roller 170 is an exemplary heatable element or heatable layer transfusion element, which is configured to rotate around a fixed axis with the movement of the belt 124. The heating element 194 is configured to heat and maintain nip roller 170 at an elevated temperature that is greater than room temperature (25° C.), such as at a desired transfer temperature for the layers 122.

The pre-transfusion heater 172 includes one or more heating devices that are configured to heat the layers 122 on the belt 124 to a temperature near an intended transfer temperature of the layer 122 prior to reaching nip roller 170. Each layer 122 desirably passes by (or through) the heater 172 for a sufficient residence time to heat the layer 122 to the intended transfer temperature. Optional post-transfusion heater 176 is located downstream from nip roller 170 and upstream from air jets 178.

During the printing or transferring operation, the belt 124 carries a layer 122 past the heater 172, which may heat the layer 122 and the associated region of the belt 124 to the transfer temperature. Suitable transfer temperatures for the part and support materials 166*p* and 166*s* of the present disclosure include temperatures that exceed the glass transition temperature of the part and support materials 166*p* and 166*s*, where the layer 122 is softened but not melted.

As further shown in FIG. 7 the gantry 184 moves the build substrate 128 (with 3D part 126*p* and support structure 126*s*) in a reciprocating rectangular pattern 186. The heater 174 heats the top surfaces of 3D part 126*p* and support structure 126*s* to an elevated temperature. As discussed in Comb et al., U.S. Patent Publication Nos. 2013/0186549 and 2013/0186558, the heaters 172 and 174 may heat the layers 122 and the top surfaces of 3D part 126*p* and support structure 126*s* to about the same or different temperatures to provide a consistent transfusion interface temperature.

The continued rotation of the belt 124 and the movement of the build platform 128 align the heated layer 122 with the heated top surfaces of 3D part 126*p* and support structure 126*s*. The gantry 184 moves the build platform 128 along the x-axis, at a rate that is synchronized with the rotational rate of the belt 124 in the feed direction 132.

As the transfused layer 122 passes the nip of the nip roller 170, the belt 124 wraps around the nip roller 170 to separate and disengage from the build platform 128. This assists in releasing the transfused layer 122 from the belt 124, allowing the transfused layer 122 to remain adhered to 3D part 126*p* and support structure 126*s*.

After release, the gantry 184 continues to move the build platform 128 along the x-axis to the post-transfusion heater 176. At post-transfusion heater 176, the top-most layers of 3D part 126*p* and the support structure 126*s* (including the transfused layer 122) may then be heated to at least the fusion temperature of the thermoplastic-based powder in a post-fuse or heat-setting step.

As mentioned above, the water dispersible material of the present disclosure compositionally comprises a sulfopolymer. It is believed that an important characteristic of the sulfopolymers of this disclosure is "charge density". Cationic and anionic polymers are characterized by their charge density. An anionic polymer is a polymer containing groups reasonably anticipated to become anionic. Charge density is usually expressed in milliequivalents (meq) of ionic groups per gram of polymer. Suitable charge densities for sulfopolyesters of this disclosure are in the approximate range of (0.4 to 0.9 meq/g). Suitable charge densities are also those that for any particular sulfopolymer provide a water dispersibility characteristic to that sulfopolymer. Sulfopolyesters with high charge densities are more easily and quickly dispersed in water, lending themselves to faster manufacturing removal. Lower charge densities produce polymers that are resistant to water dispersibility. Higher charge density relating to better dispersibility in water is believed to be also a characteristic of other anionic polymers as anionic polymers are defined herein.

The use of a sodium or lithium salt of isophthalic acid such as 5-sodiosulfoisophthalic acid (5-SSIPA) (CAS #6362-79-4) or derivatives thereof as a monomer in the synthesis of a sulfopolymer has been found to be suitable as a consumable material for use in layer-wise additive manufacturing. In addition, the inclusion of 5-SSIPA as a monomer provides a suitable charge density to that polymer if added in an amount sufficient to provide water dispersibility. 5-SSIPA can be used as a monomer in producing condensation polymers including but not limited to sulfopolyesters, sulfopolyamides, sulfopolyesteramides, sulfopolyurethanes and blends thereof results in sulfopolymers that exhibit water solubility and/or dispersibility. Sulfonation of other polymer categories such as polystyrene, polyvinyl acetate, polyvinyl chloride, polyacrylates, polyvinylidine chloride, polyimides, polyarylsulfones, polycarbonates, including copolymers or admixtures thereof are also contemplated. The use of other sulfonated aromatic diacid or diol monomers in the synthesis of a sulfopolymer is contemplated to be useful as a water dispersible 3D printing material within this disclosure. Preferably, the polymer contains approximately 18 to 40% sulfoisophthalic monomer, with a more preferred range of approximately 20 to 35% sulfoisophthalic monomer and most preferably approximately 25 to 35% sulfoisophthalic monomer. Examples of the sulfoisophthalic monomer may include but are not limited to sodiosulfoisophthalic monomers.

Sulfo-Polyesters

Water dispersible sulfo-polyesters having a glass transition temperature of greater than 100° C. can be prepared and are described in U.S. Pat. No. 5,369,210, which is hereby incorporated by reference in its entirety. Sulfo-polyesters having a Tg in the approximate range of 105 to 120 C are suitable support materials for ABS part material.

The sulfo-polyesters of this disclosure may have a dicarboxylic acid component of poly(ethylene-2,6-naphthalene dicarboxylate and a sulfo-monomer, and a diol component selected from ethylene glycol, diethylene glycol, 1,4-cyclohexanedimethanol, propane-1,2-diol and 2,2-dimethyl-1,3-propanediol. The diol component may also include bisphenol A (BpA) and/or other diphenylmethanederivatives and bisphenols with two hydroxyphenyl groups to effect higher Tgs in the polymer. Preferably, the sulfo-monomer is 5-sodiosulfoisophthalic acid (CAS #6362-79-4), or derivatives thereof. Other metallic sulfo-monomers are additionally contemplated.

The sulfo-polyester contains repeat units from a dicarboxylic acid and a difunctional sulfomonomer, and a diol. Dicarboxylic acids useful in the present invention include naphthalene dicarboxylic acid or naphthalene dicarboxylate ester such as naphthalene-2,6-dicarboxylic acid. The naphthalene dicarboxylate monomer may be in the form of the free-acid or esterified derivatives thereof. Preferably, the dimethyl ester forms are used which have the following structures:

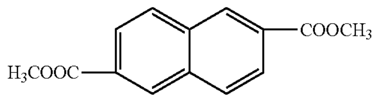

Dimethyl-2,6-Naphthalenedicarboxylate

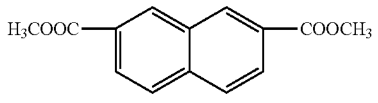

Dimethyl-2,7-Naphthalenedicarboxylate

Isomeric arrangement of the carboxylate groups on the naphthalene substrate is an important consideration to the practice of this invention. High Tg polyester resins are readily obtained when each of the aromatic rings bears one of the carboxyl(ate) groups.

In one embodiment, the sulfopolyester contains repeat units from at least two dicarboxylic acids, a diol, and a difunctional sulfomonomer. At least one of the dicarboxylic acids, component (a), is 10 to 93 mole percent based on 100 mole % dicarboxylic acid component, of naphthalene-2,6-dicarboxylic acid, naphthalene-2,7-dicarboxylic acid, naphthalene-2,6-dicarboxylate ester, or naphthalene-2,7-dicarboxylate ester. Preferably, the dimethyl ester forms are used.

In addition to the 2,6- or 2,7-naphthalene dicarboxylic acid or 2,6- or 2,7-dicarboxylic ester, the dicarboxylic acid component contains 2 to 85 mole percent of a dicarboxylic acid, component (b), which is selected from aliphatic, alicyclic, and aromatic dicarboxylic acids. Examples of these dicarboxylic acids include malonic, dimethylmalonic, succinic, dodecanedioic, glutaric, adipic, trimethyladipic, pimelic, 2,2-dimethylglutaric, azelaic, sebacic, fumaric, suberic, maleic, itaconic, 1,3-cyclopentane dicarboxylic, 1,2-cyclohexanedicarboxylic. 1,3-cyclohexanedicarboxylic, 1,4-cyclohexanedicarboxylic, phthalic, terephthalic, isophthalic, 2,5-norbornanedicarboxylic, diphenic, 4,4'-oxydibenzoic, diglycolic, thiodipropionic, 4,4'-sulfonyldibenzoic, 1,8-naphthalenedicarboxylic, and 2,5-naphthalenedicarboxylic. The anhydride, acid chloride, and ester derivatives of the above acids may also be used. The preferred dicarboxylic acid(s) to be used along with naphthalene dicarboxylic acid or naphthalene dicarboxylate ester are isophthalic acid, terephthalic acid, dimethyl terephthalate, and dimethyl isophthalate.

One aspect of this invention concerns the amount of 2,6- or 2,7-naphthalenediyl modification necessary for a given dicarboxylic acid or dicarboxylic acid combination to result in a polymer having a Tg above 89° C. In general, the amount of 2,6- or 2,7-naphthalenediyl modification will decrease in the order: aliphatic>cycloaliphatic>aromatic. Increasing the chain length of an aliphatic acid will result in a corresponding decrease in Tg, thus, requiring a higher level of naphthalenic modification.

The difunctional sulfomonomer component of the polyester may be a dicarboxylic acid or an ester thereof containing a metal sulfonate group (—SO3-), a diol containing a metal sulfonate group, or a hydroxy acid containing a metal sulfonate group. Suitable metal cations of the sulfonate salt may be Na+, Li+, K+, Mg++, Ca++, Ni++, Fe++, Fe+++, Zn++ and substituted ammonium. The term "substituted ammonium" refers to ammonium substituted with an alkyl or hydroxy alkyl radical having 1 to 4 carbon atoms. It is within the scope of this invention that the sulfonate salt is non-metallic and can be a nitrogenous base as described in U.S. Pat. No. 4,304,901 which is attached hereto as Exhibit B.

The choice of cation will influence the water dispersibility of the resulting polyester. Monovalent alkali metal ions yield polyesters that are less readily dissipated by cold water and more readily dissipated by hot water, while divalent and trivalent metal ions result in polyesters that are not ordinarily easily dissipated by cold water but are more readily dispersed in hot water. It is possible to prepare the sulfo-polyester using, for example, a sodium sulfonate salt and later by ion-exchange replace this ion with a different ion, for example, calcium, and thus alter the characteristics of the polymer. In general, this procedure is superior to preparing the polymer with divalent salts inasmuch as the sodium salts are usually more water soluble in the polymer manufacturing components than are the divalent metal salts. Polymers containing divalent and trivalent metal ions are normally less elastic and rubber-like than polymers containing monovalent ions.

Sulfopolyesters are more easily dispersed in water and/or form smaller aggregates in dispersion if the sulfopolyester has a high charge density. Cationic and anionic polymers are characterized by their charge density usually expressed in milliequivalents (meq) of anionic or cationic groups per gram of polymer. Charge densities of sulfopolyesters suitable in this disclosure are in the approximate range of at least approximately 0.4 meq. and up to approximately to 0.9 meq/g.

The difunctional sulfomonomer contains at least one sulfonate group attached to an aromatic nucleus wherein the functional groups are hydroxy, carboxy or amino. Advantageous difunctional sulfomonomer components are those wherein the sulfonate salt group is attached to an aromatic acid nucleus such as benzene, naphthalene, diphenyl, oxydiphenyl, sulfonyldiphenyl or methylenediphenyl nucleus. Examples of sulfomonomers include sulfophthalic acid, sulfoterephthalic acid, sulfoisophthalic acid, 5-sodiosulfoisophthalic acid, 4-sulfonaphthalene-2,7-dicarboxylic acid, and their esters. Metallosulfoaryl sulfonate which is described in U.S. Pat. No. 3,779,993, which is attached hereto as Exhibit C, may also be used as a sulfomonomer.

The sulfomonomer is present in an amount sufficient to provide water dispersibility to the sulfo-polyester. Preferably, the sulfomonomer is present in an amount of from 15 to 40 mole percent, more preferably 15 to 25 mole percent, based on the sum of the moles of total dicarboxylic acid content. In one example approximately 20 mole percent was found suitable.

The diol component of the polyester can be ethylene glycol, diethylene glycol, propane-1,2-diol, 1,4-cyclohexanedimethanol or 2,2-dimethyl-1,3-propanediol. The diol component may also include mixtures of the above diols. In addition, the diol component may include a sufficient amount of other cycloaliphatic or aromatic diols to suitably increase the Tg of the polymer. Included within the class of aliphatic diols are aliphatic diols having ether linkages such as polydiols having 4 to 800 carbon atoms. Aromatic diols include bisphenol A (BpA) and/or other diphenylmethanederivatives and bisphenols with two hydroxyphenyl groups. Examples of additional diols are: diethylene glycol, triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. The diol component of the polyester may also contain a diol selected from ethylene glycol, propane-1,2-diol, propane-1,3-diol, 1,4-cyclohexanedimethanol and 2,2-dimethyl-1,3-propanediol.

The particular combination of diols is stipulated only by the requirements that the final product possess a Tg equal to or greater than 45° C. while maintaining water dispersibility. Semi-crystalline and amorphous materials are within the scope of the present invention, although in most applications amorphous materials are contemplated. It is to be understood that the sulfo-polyesters of this invention contain substantially equal molar proportions of acid equivalents (100 mole %) to hydroxy equivalents (100 mole %). Thus, the sulfo-polyester comprised of components (a), (b), and (c) will have a total of acid and hydroxyl equivalents equal to 200 mole percent. The sulfo-polyesters have an inherent viscosity of 0.1 to 1.0 dl/g, preferably 0.2 to 0.6 dl/g.

A buffer may be added to the compositions of the present invention. Buffers and their use are well known in the art and do not require extensive discussions. Suitable buffers include sodium acetate, potassium acetate, lithium acetate, sodium phosphate monobasic, potassium phosphate dibasic and sodium carbonate. The buffer is present in an amount of up to 0.2 moles per mole of difunctional sulfomonomer. In one embodiment, the buffer is present in an amount of about 0.1 moles per mole of difunctional sulfomonomer.

An aspect of this disclosure concerns the effect of diol chain length on the Tg of the resulting product. The structures: HO—(OCH2-CH2)n-OH and HO—CH2-(CH2)n-OH refer to the homologous series' of diols that are derived from ethylene and oxyethylene (i.e. diethylene) glycol. Values of n for the example based on ethylene glycol are normally in the range from 1 to 12. As n increases the Tg for a resulting homopolyester resin is decreased accordingly. Therefore, modification of essentially a sulfonate-containing poly(ethylene naphthalene dicarboxylate) requires proportionately smaller molar amounts of codiol as n increases. A similar trend is observed when n increases from one (diethylene glycol) to about 10 for oxyethylene glycols.

In the case of high molecular weight oxyethylene glycol, also referred to as poly(ethylene glycol) or PEG, the value of n will be at least 10, preferably about 20, which translates into a PEG monomer molecular weight of at least 500, preferably around 1000. Typically less than 10 mole percent of PEG incorporation, based on total diol, will be used since a Tg of greater than approximately 45° C. is required. One advantage of high molecular weight PEG modification is the ability to attain higher molecular weights without losing water dispersibility. It is important to note that high sulfomonomer levels result in high process melt viscosities which limit the molecular weight attainable in the melt phase. A low molecular weight determined by an inherent viscosity measurement of less than 0.1 dl/g may result in poor physical properties such as low Tg and inadequate tensile strength.

The sulfo-polyesters can be prepared by conventional polycondensation procedures well-known in the art. Such processes include direct condensation of the acid with the diol or by ester interchange using lower alkyl esters. For example, a typical procedure consists of two stages. The first stage, known as ester-interchange or esterification, is conducted in an inert atmosphere at a temperature of 175° C. to 240° C. for 0.5 to 8 hours, preferably 1 to 4 hours. The diols, depending on their particular reactivities and the specific experimental conditions employed, are commonly used in molar excesses of 1.05 to 2.5 per mole of naphthalene dicarboxylate.

The second stage, referred to as polycondensation, is conducted under reduced pressure at a temperature of 230° C. to 350° C., preferably 265° C. to 325° C., and more preferably 270° C. to 290° C. for 0.1 to 6 hours, preferably 0.25 to 2 hours. Because high melt viscosities are encountered in the polycondensation stage, it is sometimes advantageous to employ temperatures above 300° C. since the resulting decrease in melt viscosity allows somewhat higher molecular weights to be obtained. Stirring or appropriate conditions are employed in both stages to ensure sufficient heat transfer and surface renewal for the reaction mixture. The reactions of both stages are facilitated by appropriate catalysts which are well known in the art. Suitable catalysts include, but are not limited to, alkoxy titanium compounds, alkali metal hydroxides and alcoholates, salts of organic carboxylic acids, alkyl tin compounds and metal oxides.

Sulfo-Polyamides

The sulfo-polyamides of this disclosure are amorphous and dispersible in an aqueous solution. Amorphous (transparent) polyamides are described in U.S. Pat. Nos. 2,696,482 and 3,296,204, wherein each patent is hereby incorporated by reference in its entirety. The transparent nature of the polyamide is obtained by using isophthalic acid (instead of terephthalic acid) as a reactant with a diamine to obtain the amorphous nature of the polyamide.

One example of such a transparent sulfo-polyamide obtained by polycondensation of bis-(4-amino cyclohexy) methane, at least one aromatic dicarboxylic acid and e-caprolactam, with a relative solution viscosity of at least 1.5 consisting of (1) from to 35% by weight of equimolar quantities of amino units (a) of the general formula and of aromatic dicarboxylic acid units (b) of the general formula t 1 L 0 or 0 and (2) from 30 to 65 by weight of lactam units (c) of the general formula. Particularly preferred copolyamides according to the invention are copolyamides consisting of from 60 to 70% by weight of equimolar quantities of units a) and of isophthalic acid units from 30 to 40% by weight of units (c).

In one embodiment, polyamides are prepared by employing as one of the reactants a sulfonated aromatic dicarboxylic acid. Suitable sulfonated aromatic dicarboxylic acids include those having the structural formulas

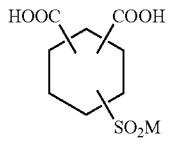

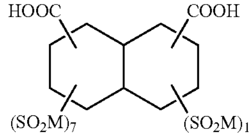

and

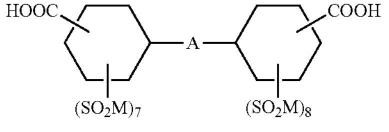

In the above structural formulas M is an alkali metal such potassium, sodium lithium and cesium; A represents a direct bond or divalent radical selected from the group consisting of —O—, —CH2-CH2-, —O—CH2-CH2-O—, —SO2-, —S—, —CF2-, —C(CH3)2-,

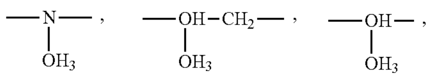

and

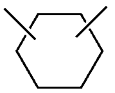

And y and z are 0 or 1, the sum of y and z being at least 1.

It will be understood that, in the above structural formulas, any or all of the hydrogens in the carboxyl groups (—COOH) can be replaced with alkyl groups, usually the lower alkyl groups, and the —OH of the carboxyl groups can be replaced by a halogen such as chlorine. Thus, the polyamide: of this invention can be prepared by employing the lower alkyl esters and the acid chlorides of the above compounds.

The polyamides of this invention will contain in their molecular formula recurring structural units of the general structure

I

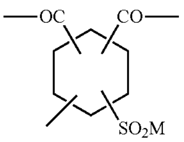

II

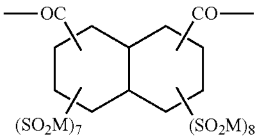

and

III

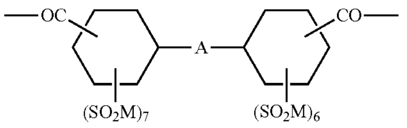

Wherein M, A, y and z are as previously defined.

In carrying out this invention the sulfonated aromatic dicarboxylic acid can be employed in varying amounts. It has been determined, however, that amounts sufficient to provide a polyamide containing the above recurring structural units in amounts of from about 5 to 50 mole percent, with about 15 to 25 mole present being preferred, can be employed. In general, the proportions of the respective recurring units in the polyamide will be found to be approximately the same as the mole proportions of the reactants.

Examples of sulfonated aromatic dicarboxylic acids that can be employed in carrying out this invention include the following:

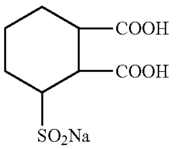

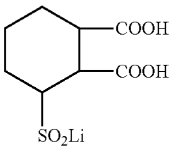

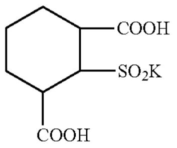

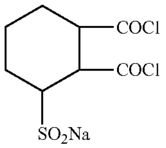

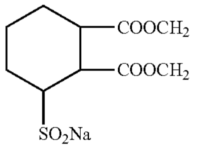

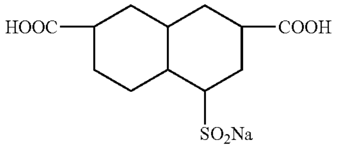

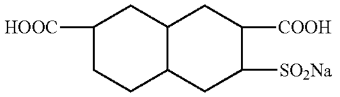

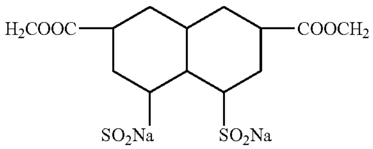

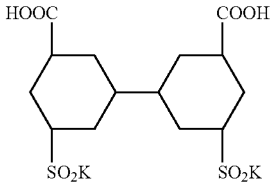

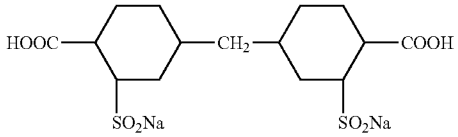

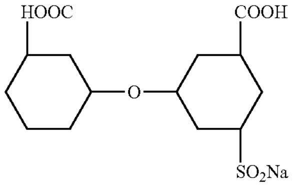

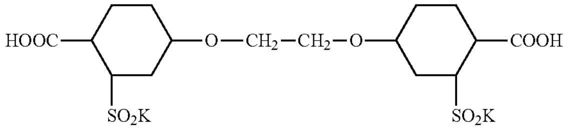

and

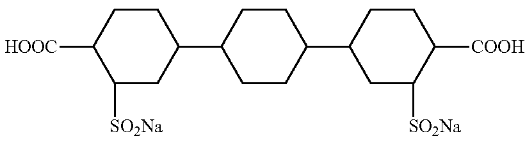

The other reactants employed in this invention are well known polyamide forming compounds and include various amino acids having the general formula

H2N-R—COOH wherein R is selected from the group consisting of a divalent aliphatic radical, either straight or branched chain; a divalent alicyclic radical; and a divalent aromatic radical. If amino acids are employed, the polyamide will be comprised of, in addition to at least one of the recurring units I, II, and III, recurring units of the general structure

—HN—R1-CO— IV wherein R is as previously defined.

Also salts of various dicarboxylic acids and diamines represented by the structural formulas

HOOC—R1-COOH and

H2N—R2-NH2 can be employed in the preparation of the polyamides of this invention. In the above formulas R is selected from the group consisting of divalent aliphatic radicals, either straight or branched chain: divalent alicyclic radicals; and divalent non-sulfonated aromatic radicals. R2 is selected from the group consisting of divalent aliphatic radicals, either straight or branched chain; divalent alicyclic radicals; and divalent aromatic radicals. Polyamides prepared from the above salts will be comprised of, in addition to at least one of the structural units I, II, and III, recurring units of the general structure

—HN—R2-NH—CO—R1-CO— V wherein R and R are as above defined.

Instead of using the salt of the above defined diamines and dicarboxylic acids, the polyamides can be prepared by a condensation reaction from a mixture of a diamine, as above defined, a dicarboxylic acid, as above defined, and a sulfonated aromatic dicarboxylic acid. Thus, for example, a mixture of the above compounds can be heated in a suitable reaction vessel, in an inert atmosphere, at a temperature of from about 200 C. to 280 C. for about 2 to 4 hours, or longer depending on the viscosity desired of the resulting polyamide. The reaction can be conveniently carried out in aqueous media or in a suitable solvent such as cresol, xylenol, o-hydroxydiphenyl, and the like. It is preferred, however, to employ the salt of the diamine and dicarboxylic acid.

In a preferred method of preparing the polyamides a salt of the sulfonated aromatic dicarboxylic acid and a diamine is first prepared. Suitable diamines for this purpose include any of those set forth hereinabove for use in preparing salts of a diamine and the defined dicarboxylic acid. The salt can be conveniently produced by dissolving substantially equimolar proportions of the diamine and the sulfonated aromatic dicarboxylic acid in water and subsequently pouring the solution into a nonsolvent for the formed salt, such as ethanol, wherein the salt precipitates out.

The diamine-sulfonated aromatic dicarboxylic acid salt is then reacted with (i) an amino acid, as above defined, or (2) a diamine-dicarboxylic acid salt, as above defined to produce the polyamides. Known polyamide forming methods can be employed. It is preferred, however, to prepare a mixture of the above ingredients and heat the mixture in an inert atmosphere at a temperature of from about 230 C. to 260° C. for about 1 hour to 2 hours to form a low molecular weight polymer, a prepolymer. The reaction is carried out in aqueous media or in a solvent such as cresol, xylenol, or o-hydroxydiphenyl. The prepolymer is then heated and stirred, in its molten form, at a temperature of from about 240 C to 300 C. for about 1 hour to 3 hours, or longer to produce a polyamide of desired viscosity. Alternatively, the prepolymer can be solidified and ground to particle size, particles of a cross-sectional diameter of about 0.03 inch or smaller being satisfactory. The particles are subsequently heated in a vacuum or in an inert atmosphere at 10 C. to 50 C below their melting point for about 2 to 4 hours. Under these conditions, the polymer can be built up to a relatively high viscosity.

Amino acids that can be used in carrying out this invention include straight chain aliphatic amino acids having the structural formula wherein n represents an integer of 5 through 10 branched chain aliphatic amino acids of the same range of carbon atoms as the straight chain aliphatic amino acids, alicyclic amino acids, and aromatic amino acids.

Specific examples of amino acids include S-amino-n-valeric acid, G-amino-n-caproic acid, 7-amino-n-heptanoic acid, 1,2-amino-n-dodecanoic acid, 3-methyl-6-amino-hexanoic acid, 4,4-dimethyl-7-aminoheptanoic acid 4-ethyl-6-amino-hexanoic acid, 4-aminocyclohexanecarboxylic acid, 3-aminomethylcyclohexanecarboxyllc acid, 4-amino-ethylcyclohexanecarboxylic acid, 4-aminomethylcyclo-hexanecarboxylic acid, 4-carboxypiperidine, «-amino-p-toluic acid, α-amino-m-toluic acid, 5-aminonorcamphane-2-carboxylic acid, and 5-aminomethylnorcamphane-2-carboxylic acid.

As set forth hereinabove various salts of certain dicarboxylic acids and diamines can be employed as one of the reactants in preparing the polyamides.

Dicarboxylic acids suitable for this purpose include aliphatic dicarboxylic acids containing from 4 to 12 carbon atoms between the carboxyl groups, either straight or branched chains, non-sulfonated aromatic dicarboxylic acids, and alicyclic dicarboxylic acids.

Specific examples of aliphatic dicarboxylic acids include oxalic acid, dimethylmalonic acid, succinic acid, glutaric acid, adipic acid, 2-methyladipic acid, 3-ethyladipic acid, pimelic acid, azelaic acid, suberic acid, sebacic acid, 3-ethylsebacic acid, and dodecanedioic acid.

Specific examples of alicyclic dicarboxylic acids include 1,1-cyclohexanedicarboxylic acid, 1,2-cyclohexanedicarboxyiic acid, 1,3-cyclohexanedicarboxyllic acid, and 1,4-cyclohexanedicarboxylic acid. The transisomer of the above acids is preferred; however, the cis isomer or mixtures of the two can be employed if desired. Other suitable alicyclic dicarboxylic acids include norcamphane-2,'5-dicarboxylic acid; norcamphane-2,6-dicarboxylic acid, and

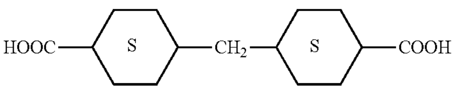

Non-sulfonated aromatic dicarboxylic acids include phthalic acid, isophthalic acid, terephthalic acid, and the halogenated derivatives of these acids. Other suitable aromatic dicarboxylic acids include those acids having the structural formula

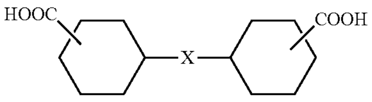

Wherein X can be, for example, a direct bond, —O—, —S—, —SO2-, —CH2-, —CH2-CH2, —CH2-CH2-CH2, —CH2-CH2-CH2-CH2-, —O—C2H4-O—, —C(CH3)2-,

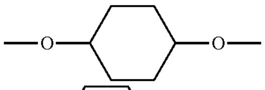 ,

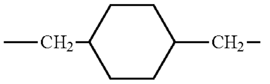 , and

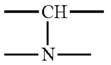

Acids containing one or more ether groups in the molecular chain as represented by ethylenedioxydiacetic acid, 4,4'-oxydibutyric acid, and 3,3'-oxydipropionic acid can be employed.

Suitable diamines for use in preparing the above-mentioned salt include aliphatic diamines containing 4 to 12 carbon atoms between the amino groups, either straight or branched chains, alicyclic diamines, and amines containing one or more aromatic nuclei.

Specific examples of aliphatic diamines include ethylene diamine, tetramethylenediamine, pentamethylenediamine, hexamethylenediamine, octamethylencdiamine, 1,12-diaminododecane, 2,2-dimethyl-1,5-diamlnopentane, 3,6-diethyl-1, 8-diaminooctane, 2-methyl-1,3-diaminopropane, 3-ethyl-1,6-diamlnohexane, and 4-butyl-1,10-decamethyienediamine. Diamines containing one or both amino groups on a secondary carbon atom and diamines containing secondary amino groups can also be employed.

Examples of specific alicyclic diamines include 1,2-diaminocyclohexane, 1,3-diaminocyclohexane, 1,4-diamino-cyclohexane, 1,1 cyclohexanebis(methylamine), 1,2 cyclo-hexanebis(methylamine), 1,3 cyclohexanebls (methylamine), and 1,4 cyclohexanebis(methylamine). These diamines can be used as the transisomer or use mixtures of cis and trans-isomers. Other suitable alicyclic diamines include 2.5 norcamphanediamine, 2.6 norcamphanediamine, 2,5 norcamphanebis(methylamine), and 2,6-norcamphanebis(methylamine).

Diamines containing one or more aromatic nuclei include o-, m-, and p-xylene-α,α-diamines, and 3,4'-dl-(aminomethyl)diphenyl.

Diamines containing ether groups such, for example, as oxybis(propylamine), 3,3 (ethylenedioxy) bis(propylamine), and 3,3'-(2,2-dimethyltrimethylenedioxy) bis(propylamine) can be employed.

It is understood that the polyamides herein can be prepared by employing, in place of the above-defined acidic compounds, the lower alkyl esters thereof. The phenyl ester can also be employed if desired. Further, the acid chloride of the acidic compound can be employed in preparing polyamides of this invention if desired. This is usually accomplished in the presence of an acid-accepting agent.

In some instances it can be desirable to heat the sulfonated aromatic dicarboxylic acid with an excess of a diamine, usually about 25 mole percent to 45 mole percent, to provide a diamine that is terminated with amino groups. The dicarboxylic acid is then added in an amount molecularly equivalent to the excess diamine employed and the reaction is completed as above described.

Sulfo-Polyurethanes

Sulfo-polyurethanes of this disclosure are produced by reacting an isocyanate containing two or more isocyanate groups per molecule ($R—(N═C═O)_{n\geq 2}$) with a polyol containing on average two or more hydroxy groups per molecule (R'—$(OH)_{n\geq 2}$), in the presence of a catalyst or by activation with ultraviolet light.

The properties of polyurethane may be greatly influenced by the types of isocyanates and polyols used to make the polymer. In this disclosure, the polyurethane desired is a thermoplastic polyurethane (TPU), that is a polyurethane that has not been crosslinked. (although crosslinked polyurethanes have been contemplated). By thermoplastic is meant that the polyurethane does not soften or melt when heated. TPUs are typically formed by the reaction of (1) diisocyanates with short-chain diols (so-called chain extenders) and (2) diisocyanates with long-chain diols. The three reaction compounds allow for an enormous variety of different TPUs.

Typically, polyurethanes have a rather low Tg such as below 50 C. To increase the Tg to one suitable for a water dispersible 3D printing material for this disclosure, higher molecular weight molecules are added to the polymer. Such molecules may be added via the diisocyanate reactant. Such molecules include cyclo aliphatic or aromatic components. Cycloaliphatic isocyanates, such as isophorone diisocyanate (IPDI) are believed to be suitable to raise the Tg to levels of 100 C or greater. Aromatic isocyanates such as diphenylmethane diisocyanate (MDI) or toluene diisocyanate (TDI) are also believed to be suitable. Although specific aliphatic and aromatic diisocyanates have been mentioned herein, it is contemplated that other diisocyanates may also be used for the purposes described herein.

The 5-sodiosulfoisophthalic acid (5-SSIPA) component is introduced by conversion of the acid component to an isocynate or to a diol component. If converted to a diol component, the sodium salt can be substituted for the polyol needed to produce the polyurethane.

Alternatively a polyol component can be used having higher molecular groups such as the cycloaliphatic or aromatics discussed above and the sodium sulfoisophthalic isocynate may be directly used in the production reaction to produce the polyurethane.

The following examples are included for illustrative purposes only and are not intended to limit the scope of this disclosure.

EXAMPLES

The table set forth below associated polymers with a particular Tg, used to make parts, with water dispersible polymer types or combinations made under this disclosure having compatible Tgs.

| Part Material/ Non-Water dispersible Polymers | Glass Transition Temperature (Tg) ° C. |
|---|---|
| Polylactic acid | 48 |
| Acrylonitrile Butadiene Styrene | |
| #1 | 123 |
| #2 | 120 |
| Polycarbonate | |
| #1 | 155 |
| #2 | 155 |
| Ultem 9085; polymer from Stratasys Ltd. of Eden Prairie, MN, USA | 185 |
| Ultem 1010; polymer from Stratasys Ltd. of Eden Prairie, MN, USA | 225 |

-continued

| | Support Structure Water dispersible Polymer Compositions tested, having Compatible Tgs, % | | | | | | |
|---|---|---|---|---|---|---|---|
| Monomers | Polyester | Polyester | Polyester | Polyester | Polyester | Polyamide | Polyamide |
| Composition One: | | | | | | | |
| Ethylene glycol | | 100 | 100 | 100 | 100 | | |
| Composition Two: | | | | | | | |
| Diethylene glycol | 75 | | | | | | |
| 1,4-Cyclohexyldimethanol | 25 | | | | | | |
| Composition Three Variations: | | | | | | | |
| Dimethyl napthalene dicarboxylic acid | | 60 | 60 | 50 | 60 | | |
| Adipic acid | | 5 | | | | | |
| Succinic acid | | | 10 | 10 | 5 | | |
| Dimethyl 5-sodiosulphoisophthalic acid | | 35 | 30 | 40 | 35 | | |
| Composition Four Variations: | | | | | | | |
| 5-sodiosulphoisophthalic acid | 24 | | | | | 30 | |
| Terephthalic acid | | | | | | 35 | |
| Isophthalic acid | 76 | | | | | 35 | |
| Composition Five: | | | | | | | |
| Hexamethyldiamine | | | | | | 100 | |
| Composition Six: | | | | | | | |
| 4,4'-methylenebis(2-methylcyclohexylamine) | | | | | | | 36 |
| Laurolactam | | | | | | | 28 |
| Isophthalic acid | | | | | | | 6 |
| 5-sodiosulphoisophthalic acid | | | | | | | 30 |

What is claimed:

1. A water dispersible sulfo-polymer configured for use as a consumable feedstock in an additive manufacture of a part comprising a non water dispersible polyamide based polymer having a glass transition temperature ranging from 185° C. and 225° C., wherein the water dispersible sulfo-polymer is a reaction product of a sulfo monomer and the reaction product is a sulfo-polyamide with approximately 18 to 35% sulfoisophthalic monomer wherein the water dispersible sulfo-polymer has a glass transition temperature within ±20° C. of the glass transition temperature of the non water dispersible polyamide based polymer, the water dispersible sulfo-polymer being dispersible in water resulting in separation of the water dispersible polymer from the three-dimensional part comprising the non water dispersible polymer, wherein the consumable feedstock comprises a filament form or a powder having a charge control agent.

2. The water dispersible polymer of claim 1 wherein the reaction product is a condensation reaction.

3. The water dispersible polymer of claim 1 comprising approximately 20 to 35% sulfoisophthalic monomer.

4. The water dispersible polymer of claim 1 comprising approximately 25 to 35% sulfoisophthalic monomer.

5. The water dispersible polymer of claim 1 wherein the water dispersible polymer is substantially amorphous.

6. The water dispersible polymer of claim 1 wherein the water dispersible polymer is at least semi-crystalline.

7. The water dispersible polymer of claim 1 wherein the water dispersible polymer has a charge density of at least about 0.4 meq./g, suitable to exhibit water solubility or water dispersibility without the aid of any other solubility or dispersibility adjuvant.

8. The water dispersible polymer of claim 1 wherein a sulfonated aromatic diacid or diol monomer is used in the formation of the reaction product.

9. A water dispersible sulfo polymer configured for use as a consumable material in an additive manufacture of a non water dispersible polyamide based polymer part comprising:

a non water dispersible polyamide based polymer, wherein the water dispersible polymer is a reaction product of a metal sulfo monomer, the reaction product is a sulfo-polyamide with approximately 18 to 35% sulfoisophthalic monomer, the water dispersible sulfopolymer being dispersible in water resulting in separation of the water dispersible polymer from the part comprising the non water dispersible polyamide based polymer, wherein the non water dispersible polyamide based polymer has a glass transition temperature ranging from 185° C. and 225° C. and the water dispersible sulfo polymer has a glass transition temperature of ±20° C. of the glass transition temperature of the non water dispersible polyamide based polymer, wherein the consumable feedstock comprises a filament form or a powder having a charge control agent.

10. The water dispersible sulfopolymer of claim 9 wherein the reaction product is a condensation reaction.

11. The water dispersible sulfo polymer of claim 9 comprising approximately 20 to 35% sulfoisophthalic monomer.

12. The water dispersible sulfo polymer of claim 9 comprising approximately 25 to 35% sulfoisophthalic monomer.

13. The water dispersible sulfo polymer of claim 9 wherein the water dispersible polymer is substantially amorphous.

14. The water dispersible sulfo polymer of claim 9 wherein the water dispersible polymer is at least semi-crystalline.

15. The water dispersible sulfo polymer of claim 9 wherein the water dispersible polymer has a charge density of at least about 0.4 meq./g, suitable to exhibit water solubility or water dispersibility without the aid of any other solubility or dispersibility adjuvant.

16. A consumable feedstock material for use in an additive manufacturing system, the consumable feedstock material comprising:

a water dispersible sulfo polymer comprising a reaction product of a sulfur monomer and the reaction product is a sulfo-polyamide with approximately 18 to 35% sulfoisophthalic monomer, wherein the consumable feedstock comprises a filament form or a powder having a charge control agent wherein the water dispersible sulfo polymer has a glass transition temperature within ±20° C. of the glass transition temperature of a non water soluble polyamide based part material having a glass transition temperature ranging from 185° C. and 225° C.

17. The consumable feedstock material of claim 16, wherein the reaction product includes approximately 20 to 35% sulfoisophthalic monomer.

18. The consumable feedstock material of claim 16, wherein the reaction product includes approximately 25 to 35% sulfoisophthalic monomer.

19. The consumable feedstock material of claim 16, wherein the water dispersible sulfo polymer is substantially amorphous.

20. The consumable feedstock material of claim 16, wherein the water dispersible sulfo polymer is at least semi-crystalline.

21. The consumable feedstock material of claim 16, wherein the water dispersible sulfo polymer has a charge density of at least about 0.4 meq./g.

22. The consumable feedstock material of claim 16, wherein the water dispersible sulfo polymer has a charge density of between about 0.4 meq/g and about 0.9 meq./g.

* * * * *